United States Patent [19]
Cumming

[11] Patent Number: 5,837,156
[45] Date of Patent: Nov. 17, 1998

[54] METHODS OF FABRICATING INTRAOCULAR LENSES AND LENS MOLDS

[76] Inventor: J. Stuart Cumming, 1211 W. #201 LaPalma Ave., Anaheim, Calif. 92801

[21] Appl. No.: 727,177

[22] Filed: Sep. 30, 1996

Related U.S. Application Data

[63] Continuation of Ser. No. 230,740, Apr. 21, 1994, abandoned.

[51] Int. Cl.$^6$ ..................................................... C25D 1/10
[52] U.S. Cl. ........................... 249/119; 249/135; 205/50; 205/70; 264/1.1; 264/2.5
[58] Field of Search ............................... 264/2.5, 2.7, 1.1; 249/119, 135, 139; 205/70, 50; 204/281

[56] References Cited

U.S. PATENT DOCUMENTS

| | | | |
|---|---|---|---|
| 2,765,268 | 10/1956 | Bemelmans | 205/70 |
| 4,165,158 | 8/1979 | Travnicek | 351/160 |
| 4,615,847 | 10/1986 | Howden | 264/1.7 |
| 4,696,722 | 9/1987 | Towlson | 205/50 |
| 4,740,276 | 4/1988 | Marmo et al. | 205/71 |
| 4,749,530 | 6/1988 | Kunzler | 264/2.7 |
| 4,932,968 | 6/1990 | Caldwell | 623/6 |
| 5,185,107 | 2/1993 | Blake | 264/2.5 |
| 5,269,978 | 12/1993 | Umetsu et al. | 264/1.4 |
| 5,300,263 | 4/1994 | Hoopman | 264/2.5 |

FOREIGN PATENT DOCUMENTS

| | | |
|---|---|---|
| 2040213 | 1/1979 | United Kingdom . |

*Primary Examiner*—John Niebling
*Assistant Examiner*—Brendan Mee
*Attorney, Agent, or Firm*—Boniard I. Brown

[57] ABSTRACT

The two sides of a multiple cavity mold having electroformed mold cavities for molding intraocular lenses with integral haptics are made by a preferred electroforming procedure involving the use of either a single primary master having a single cavity corresponding to the portion of the lens at either side of its median plane transverse to its optic axis if the lens to be molded is symetrical about both this transverse median plane and its longitudinal median plane containing the optic axis, or a pair of primary masters having single cavities, respectively, corresponding to the portions of each lens at opposite sides of its transverse median plane if the lens is unsymmetrical about either plane. The preferred electroforming procedure involves electroforming a secondary single male master on the single primary master or a single secondary male master on each primary master of the primary master pair, depending upon the symmetry of the lens to be molded, electroforming a plurality of individual tertiary female masters on the secondary male master or masters to form one or two groups of tertiary masters, as the case may be, mutually joining each group of tertiary female masters to form a multiple cavity master assembly, and utilizing individual tertiary female mold members and the master assembly or master assemblies to form a pair of final multiple cavity mold sides at least one of which is a unitary electroformed multiple cavity mold member and the other of which may comprise a plurality of the individual female mold members.

44 Claims, 9 Drawing Sheets

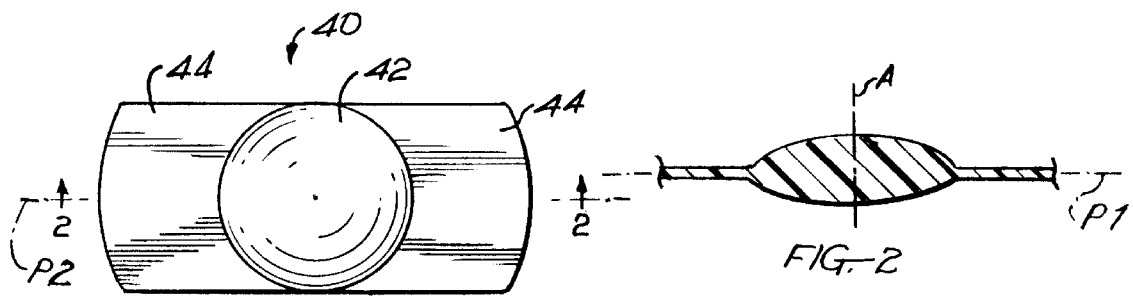
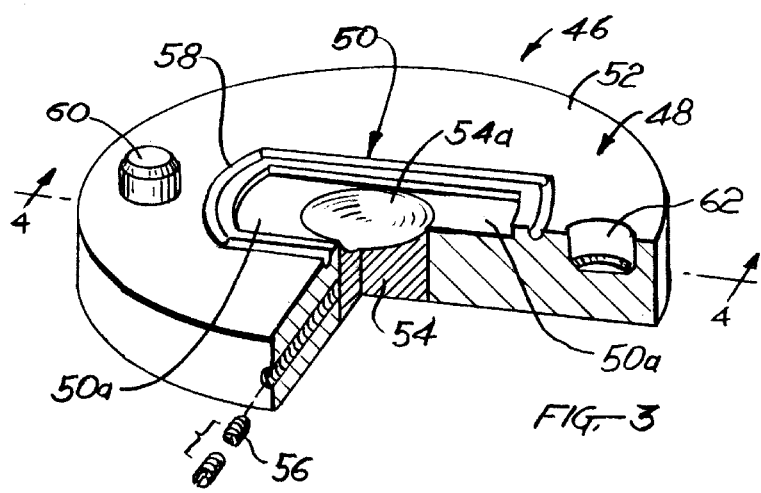
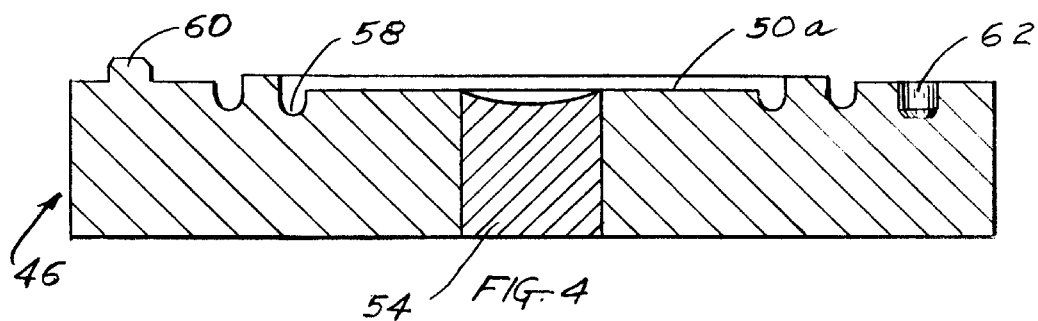

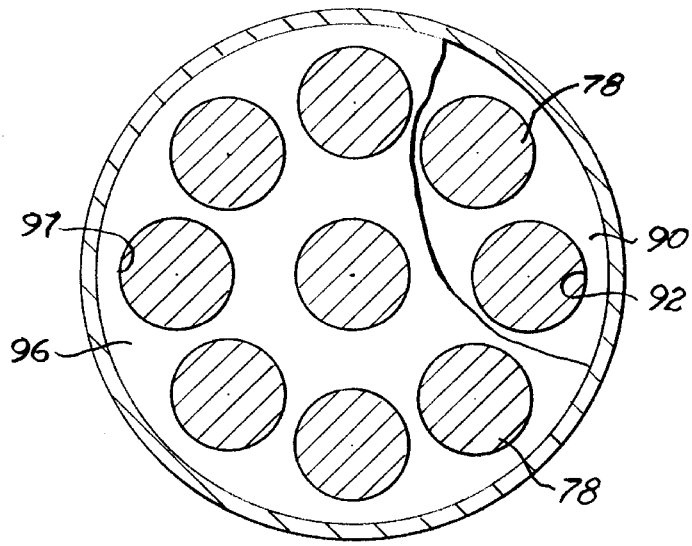
FIG.—12
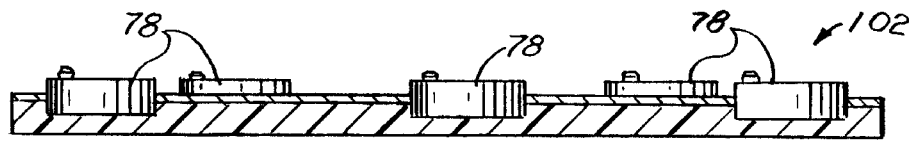
FIG.—13
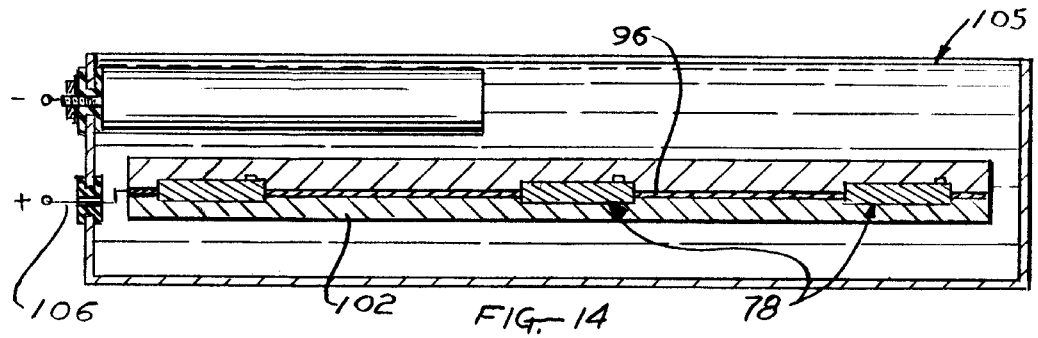
FIG.—14
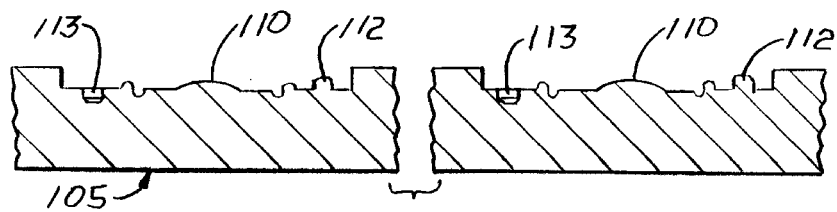
FIG.—15

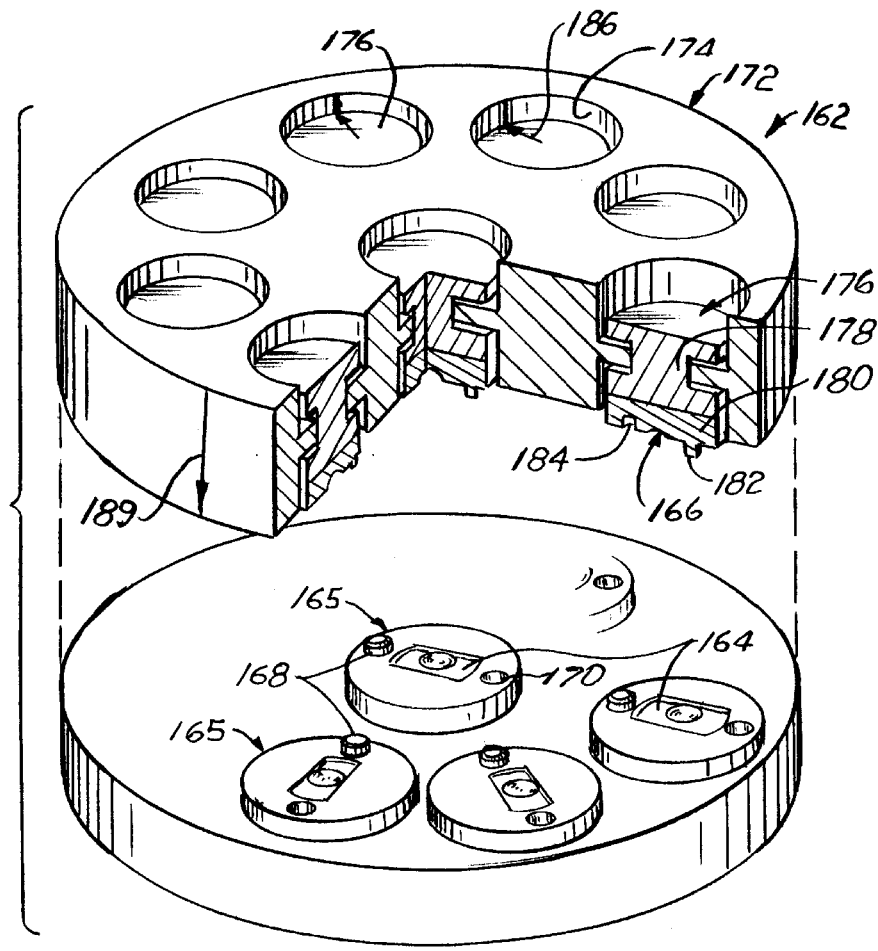
FIG.-26
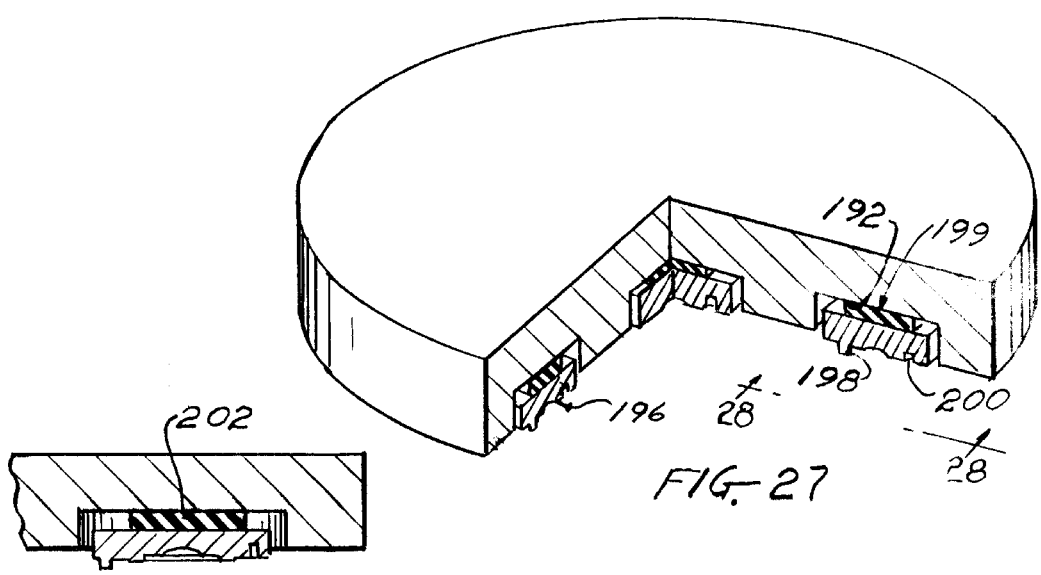
FIG.-27
FIG.-28

METHODS OF FABRICATING INTRAOCULAR LENSES AND LENS MOLDS

This application is a continuation of application Ser. No. 08/230,740 filed on Apr. 21, 1994, now abandoned.

BACKGROUND OF THE INVENTION

1. Field of the Invention:

This invention relates generally to the art of making intraocular lenses and more particularly to novel molds for molding intraocular lenses and to a novel method of making the molds.

2. Discussion of the Prior Art:

A great variety of intraocular lenses, hereafter referred to in places simply as lenses, have been devised. This invention is concerned with molded unitary lenses of the kind which have a central optic and haptics integrally joined to and extending from diametrically opposite edges of the optic. Lenses of this kind are molded from a suitable optically transparent molding compound, such as a silicone compound, which is introduced into a mold cavity in a liquid state and allowed or caused to set to a solid state within the cavity while it is closed.

A conventional intraocular lens mold has two mold members, commonly referred to as mold sides, arranged face to face and having cavities in their facing sides. These mold sides are movable to and from closed positions in which the cavities in the members form a mold cavity corresponding to the shape of the lens to be molded. The two mold sides have indexing pins and sockets which interengage to align the cavities in the sides when they are in closed positions. A measured quantity of liquid silicone or other lens molding compound is introduced into this mold cavity, as by placing the silicone in the cavity of one mold side when the mold is open. The silicone sets while the mold is closed.

The cavity in each mold side corresponds substantially to one half of the molded lens, that is to the half portion of the lens at one side of its median plane transverse to the optic axis of the lens. The cavity in each mold side has a central optic portion which shapes the corresponding half of the lens optic and two haptic portions at diametrically opposite sides of the optic portion which shape the corresponding halves of the lens haptics. The floor surface of each cavity has an optic surface region which shapes the corresponding face of the lens optic and two haptic surface regions at diametrically opposite sides of the optic region which shape the side surfaces of the lens haptics. When the mold sides are closed, the cavities in the two sides are precisely aligned to form a closed lens mold cavity conforming to the shape of the lens to be molded.

Molding precision intraocular lenses requires that the cavities in the mold members be precisely sized and shaped and that all the cavity surfaces be highly polished. This is particulary true of the optic surface regions of the cavity floors which must not only be highly polished but also precisely contoured in order to provide the optic of the molded lens with the required optical power and other required optical characteristics. To this end, the mold member which forms each side of the conventional intraocular lens mold is composed of two parts which are a main body and an optic pin. The main body of each mold member includes the haptic-forming portions and haptic surface regions of its cavity. The optic pin of each mold member is removably positioned within a bore in the body of the member which opens at one end into the cavity at the optic region of the cavity floor. The inner end face of this pin forms the optic region of the cavity floor and is contoured to conform precisely to the desired curvature of the adjacent optic surface of the lens being molded.

This two part construction of each mold side of the conventional intraocular lens mold provides two important benefits. First, it permits the haptic portions and surfaces of the cavity in each mold side to be formed and polished separately from the end face of the optic pin and permits this end face to be highly polished and honed to a precise optical contour while the pin is held in a separate jig. Secondly, the two part mold construction permits a basic mold body to be used with interchangeable optic pins having different optical curvatures corresponding to different lens optic powers and characteristics.

This conventional intraocular lens mold, however, has a distinct disadvantage. This disadvantage resides in the extremely high mold costs associated with using the mold for mass production of intraocular lenses. Thus, each two part conventional mold is capable of molding only a single lens at a time. Mass production of lenses using the conventional mold thus requires fabrication of a large number of such molds. Since each conventional mold is essentially hand made, the cost of making the mold is very high, commonly on the order of $6000 to $7000. Fabrication of the large number of molds required for lens mass production thus involves an extremely high cost. In addition, intraocular lenses must be made in a wide range of differing optic powers, surface contours, and other optical characteristics which greatly increases the cost factor. Finally, the conventional molds must be replaced from time to time due to wear, damage, and the like, and the mold replacement costs are as high as the original mold costs. Accordingly, there is a definite need not only for an improved intraocular lens mold but also for an improved method of making such molds.

BRIEF DESCRIPTION OF THE INVENTION

This invention provides such an improved and relatively low cost intraocular lens mold and novel method of making the mold. According to one aspect of the invention, the mold making method involves the use of a primary master mold means which comprises either (a) a single primary master having a mold formation corresponding to a portion of the lens to be molded, i.e. the portion of the lens at one side of its median plane transverse to the optic axis of the lens, if the lens is symmetrical about both its median plane transverse to its optic axis and a median plane containing this axis and the longitudinal centerline of the lens haptics, or (b) a pair of primary masters having mold formations corresponding to the lens portions, respectively, at opposite sides of the median plane transverse to the optic axis of the lens if the lens is unsymetrical about either or both median planes. This primary master mold means and an electroforming procedure according to the invention, involving an initial step of electroforming a secondary mold master on each primary master, are then utilized to form pair of final electroformed mold members each containing at least one electroformed cavity. The cavities in the two final mold members will be identical or different depending upon whether the primary master mold means used in the electroforming procedure comprises a single primary master or the pair of primary masters. This depends, in turn, on whether the lens to be molded has a symmetrical or unsymmetrical configuration.

When used to mold intraocular lenses, the two final mold members of this invention are placed face-to-face to form the two parts or sides of an intraocular lens mold in which each cavity in one mold member is aligned with a cavity in the other mold member. These two mold sides are movable to and from closed positions in which each pair of aligned cavities in the two mold sides form a mold cavity corresponding to the shape of the lens to be molded.

According to another aspect of its aspects, the invention provides a method of making a multiple mold assembly or multiple mold master assembly for use in practicing the lens mold making method of the invention. This aspect of the invention involves fabricating a plurality of individual mold members each having a mold formation corresponding to a portion of the lens to be molded, and mutually joining these individual mold members to form an assembly of the mold members. In some cases, the individual members of this assembly are utilized as masters which are rigidly joined to form a multiple mold electroforming master for use in forming a final electroformed multiple cavity female mold member to serve as one side of a multiple cavity lens mold. In other cases, the individual mold members of the assembly are used as final mold members which are joined to form a multiple cavity mold assembly which itself is utilized as one side of a multiple cavity mold and in which the individual mold members are capable of limited movement to align their cavities with corresponding cavities in the opposite mold side.

According to another of its aspects, the invention provides a novel method of rigidly joining the individual mold masters to form a multiple mold master by submerging the posterior portions of these masters in a layer of material, such as epoxy, which sets or hardens to form a supporting base for and rigidly mounting the masters.

It is worthwhile to note at this point that in the description of this invention, mention is made of mold members, final mold members, and masters. A final mold member is a member which is actually used to mold a lens. A master is a member on which a metal is electroformed. The expression "mold member" means either a master or a final mold member. Also mentioned are mold formations, male and female mold formations, and male and female mold members and masters. The expression mold formation is used herein in a generic sense to cover both a cavity entering the surface of a master (female mold formation) and a protruding formation on the surface of a master (male mold formation). A male mold member or master has a protruding male mold formation and a female mold member or master has a female mold formation or cavity. Finally, mention is made that an electroformed member corresponds to a master. This means simply that the electroformed member complements or is a reverse gender copy of the master. For example, electroforming on a female master produces an electroformed male member having a protruding male formation which complements and has a surface contour conforming to that of the cavity in the female master. Conversely, electroforming on a male master produces an electroformed female member having a cavity which complements and has a surface contour conforming to that of the protruding formation on the male master.

In the preferred mold embodiments and mold making method described and illustrated herein, the single primary master which is used when the lens to be molded is symmetrical and each of the two primary masters which are used when the lens is unsymmetrical is a female master which is substantially identical to the existing conventional intraocular lens mold discussed above and includes a mold body proper having a cavity and an indexing pin and socket, and a replaceable optic pin removably positioned in the body. The cavity in the single primary female master which is used when the lens to be molded is symmetrical corresponds to the portion of the lens at one side of its median plane transverse to its optic axis. The cavities in the pair of primary female masters which are used when the lens to be molded is unsymmetrical corresponds to the portions, respectively, of the lens at opposite sides of this median plane.

The preferred mold making method of the invention involves:

(a) electroforming, on the single primary female master of the single master primary mold means, a single secondary male master having a male mold formation corresponding to the cavity in the respective primary female master, or electroforming, on each female master of the dual master primary mold means, a secondary male master having a male mold formation corresponding to the cavity in the respective primary female master, depending on whether the lens to be molded is symmetrical or unsymmetrical, (b) Electroforming on the single secondary male master derived from the single master primary mold means at least one female tertiary mold member or master having a cavity corresponding to the male mold formation of the secondary male master and substantially identical to the cavity in the single master primary mold means, or electroforming on each of the secondary male masters derived from the dual master primary mold means at least one female tertiary mold member or master having a cavity corresponding to the male mold formation of the respective secondary male master and substantially identical to the corresponding cavity in the dual master primary mold means, again depending on whether the lens to be molded is symmetrical or unsymmetrical, (c) If a single cavity intraocular lens mold is desired, assembling two of the electroformed female tertiary mold members in (b) above face to face to form the two sides of the mold, (d) If a multiple cavity lens mold is desired, mutually joining several of the electroformed female tertiary mold members in (b) above to form a multiple cavity female mold assembly or master assembly containing a plurality of the tertiary female members in such a way that the several tertiary female members are either rigidly joined to form a rigid multiple cavity female master assembly or joined in such a way as to form a final multiple cavity mold assembly in which the individual mold members are capable of limited movement, (e) Electroforming on the multiple cavity female master assembly in (d) above a multiple mold male master having a multiplicity of male mold formations corresponding to the cavities in the respective female master assembly, (f) Electroforming on the electroformed multiple mold male master in (e) above a final multiple cavity female mold member having a multiplicity of cavities corresponding to the cavities in the electroformed male master and each substantially identical to the cavity in the respective primary female master in (a) above, (g) Placing on the electroformed multiple cavity female mold member in (f) above, over each cavity in the female mold member, an electroformed tertiary female master in (b) above having the same or different cavity configuration as the cavities in the multiple cavity female mold member, depending upon whether the lens to be molded is symmetrical or unsymmetrical and in such a way that the cavity in each tertiary master is aligned with the respective cavity in the multiple cavity female mold member, (h) Rigidly mutually joining the individual tertiary female masters in (g) above to form a second multiple cavity master assembly, (i) Electroforming a second multiple mold male master on the multiple cavity master assembly in (h) above, (j) Electroforming a second final multiple cavity female mold member on the electroformed multiple mold male master in (i) above, and (k) Assembling the final electroformed multiple cavity female mold member in (f) above with either the second electroformed multiple cavity female mold member in (j) to form the two sides of a multiple cavity lens mold in which the corresponding cavities in the two mold sides, when closed, are automatically aligned as a result of the electroforming procedure utilized to form these mold sides and inter engagement of indexing pin and socket formations on the mold sides, or with a multiple cavity mold member in (d) above comprising individually movable mold members to form the two sides of a multiple cavity lens mold in which the corresponding cavities in the two mold sides are mechanically aligned when the mold closes by alignment movement of the individual mold members.

The end products of the preferred practice of the present mold making method are single cavity and multiple cavity intraocular lens molds whose sides are two mold members according to the invention having electroformed cavities and comprising either two electroformed final female mold members having inter engagable indexing pin and socket formations for bodily locating the two electroformed mold members relative to one another in positions wherein their corresponding cavities are precisely aligned because of the method use to electroform the members, or one electroformed multiple cavity final female mold member and one mold assembly having individual electroformed (tertiary) female mold members which are individually movable to align the corresponding cavities in the two mold sides.

BRIEF DESCRIPTION OF THE DRAWINGS

FIG. 1 illustrates one type of intraocular lens which may be molded utilizing the present invention;

FIG. 2 is a section taken on line 2—2 in FIG. 1;

FIG. 3 is a perspective view, partly in section, of a presently preferred primary female master according to the invention;

FIG. 4 is an enlarged section taken on line 4—4 in FIG. 3;

FIG. 12 is a section, partly broken away, taken substantially on line 12—12 in FIG. 10;

FIG. 13 is an inverted section through the multiple cavity female master assembly shown in FIG. 11.

FIG. 14 illustrates a following step of the preferred method involving electroforming a multiple mold male master on the female master assembly of FIG. 13;

FIG. 15 is an enlarged fragmentary section through the multiple mold male master in FIG. 14;

FIG. 26 is an enlarged perspective view, partly broken away, of a modified intraocular lens mold according to the invention whose sides comprise, respectively, an electroformed final multiple cavity female mold member and a modified final multiple cavity female mold member consisting of a plurality of individual electroformed tertiary female mold members mounted for limited independent movement on a supporting base;

FIG. 27 is a perspective view, partly broken away, of a further modified final multiple cavity female mold member which may be used in the lens mold of FIG. 26 in place of the upper mold member in the latter figure;

FIG. 28 is a view looking in the direction of the arrows on line 28—28 in FIG. 27;

DESCRIPTION OF THE PREFERRED EMBODIMENTS

Figure 5:
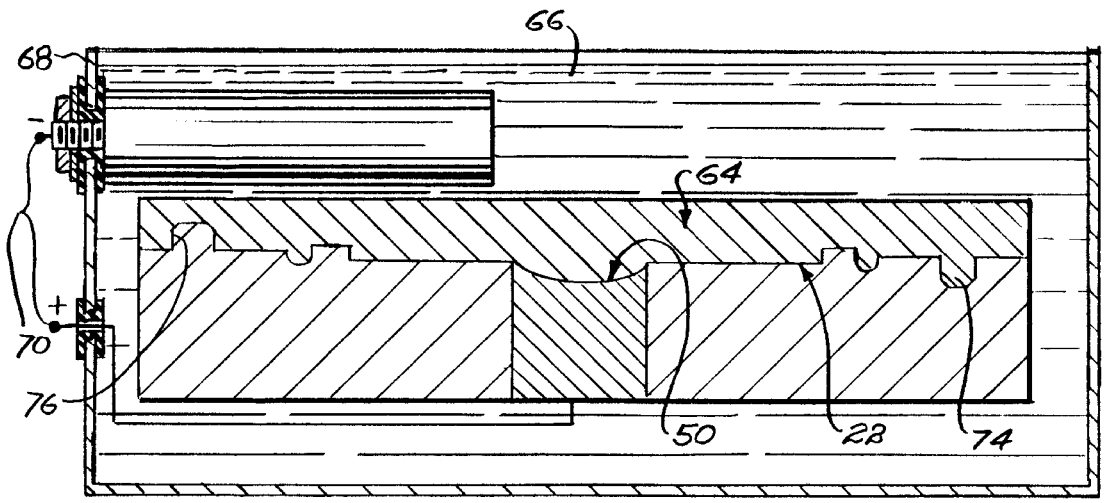
FIG. 5 illustrates an initial electroforming step of the preferred mold making method of the invention involving electroforming a secondary male master on the primary female master of FIG. 3.

Turning now to the accompanying drawings and first to FIGS. 1 and 2 there is illustrated one example of a conventional intraocular lens 40 which may be molded with an improved lens mold of this invention. The lens 40 has a central optic 42 and plate haptics 44 integrally joined to and extending from diametrically opposite edges of the optic. The particular lens illustrated is symmetrical about both a longitudinal median plane P1 transverse to the optic axis A of the lens and bisecting the haptics 44 in their thickness direction and about a longitudinal median plane P2 containing the optic axis and the longitudinal centerline of the haptics. As described later in connection with FIGS. 29 and 30, the lens molds of this invention may be used to mold lenses which are unsymmetrical about either or both median planes P1, P2. Preferred molds according to this invention will be described by describing the improved mold making method of the invention.

The improved mold making method involves a procedure whose first step is providing a primary master means comprising either a single primary master or a pair of primary masters. The single primary master will have a lens mold formation corresponding to a certain portion of the lens to be molded, namely the portion of the lens at one side of its median plane P1. The pair of primary masters will have lens mold formations, respectively, corresponding to different portions of the lens to be molded, namely the lens portions at opposite sides of its median plane P1. The primary master means comprising the single primary master is provided, i.e. utilized, if the lens to be molded is symmetrical about both median planes P1 and P2, as is the lens 40. The primary master means comprising the pair of primary masters is utilized if the lens to be molded is unsymmetrical about either or both of its median planes P1, P2.

The mold making method of the invention will be described first in connection with making a mold for molding a symmetrical lens, specifically the lens 40 in FIGS. 1 and 2. FIGS. 3 and 4 illustrate the preferred primary master means 46 for this practice of the method. Primary master means comprises a single primary master 48 having a lens mold formation 50 corresponding to one portion of the lens to be molded, in this case the portion of the lens 40 at either side of its median plane P1.

It will become evident as the description proceeds, that the gender of the primary master lens mold formation 50 may be either male (a protruding formation) or female (a cavity). The illustrated preferred primary master 48 is a female member whose mold formation 50 is of female gender and comprises a cavity corresponding to the half portion of the lens 40 at either side of its median plane P1. As mentioned earlier, the term "corresponding" and other similar terms as used herein means that two formations are reverse gender copies of and complement one another. For example, the cavity 50 in the primary master 48 is a female gender copy of and complements the portion of the lens 40 at either side of its median plane P1.

The preferred primary female master 48 illustrtated is a two part member similar to one side of the conventional intraocular lens mold mentioned earlier. Thus, the primary master 48 comprises a main body 52 which is circular for the reasons stated later and a removable coaxial optic pin 54. The master body 52 contains spaced haptic-forming portions 50 of the cavity 50 which are located at diametrically opposite sides of the optic pin 54. The floor of the cavity 50 is formed, in part, by the coplanar floor surfaces of the haptic forming portions 50A of the cavity and in part by the end face 54A of the optic pin 54. This end face is concave and its outer circumferential edge is precisely flush with the floor surfaces of the haptic portions 50A. The pin is removably fixed in position by a set screw 56.

About and spaced a small distance from the open side of the cavity 50 is the customary flash or overflow groove 58. At opposite ends of the cavity are complementary male and female indexing formations comprising an indexing pin 60 and an indexing socket 62. These indexing formations are situated and sized so that if two of the primary masters 46 were placed in coaxial face to face relation and rotated 180 degrees relative to one another about their common axis, the two masters could be assembled with the pin 60 of each master engaging in the socket 62 in the other master to precisely align the cavities 50 in the two masters. The two cavities would then form a closed cavity corresponding to the overall shape of the lens 40.

The primary female master 48 can be fabricated in the same way as each mold member of a conventional intraocular lens mold. Thus, the body 52 of the member may be machined in any suitable way from steel or other metal. The surfaces of the cavity portions 50A in the body are highly polished in the same way as the conventional mold cavity. The optic pin 54 is machined separately and its end face 54A is machined and polished prior to placement of the pin in the body 52. The master is preferably chrome plated for wear resistance.

The next step of the improved mold making method involves electroforming a secondary metallic master 64 on the cavity side of the primary female master 48, as illustrated in FIG. 5. This electroforming step and the other electroforming steps hereinafter described are performed conventionally according to procedures known in the electroforming art. All sides of the primary female master 48, except its cavity side, are coated with an appropriate electrical barrier material, placing the master in a suitable electroforming electrolyte or bath 66 within an electroforming tank 68 and connecting the master and the tank wall and/or an electrode formed of material to be electroplated in the bath to electrical terminals 70. These terminals are connected to a D.C. electrical source for applying between the master and the electroforming bath a D.C. voltage which causes electrodeposition of metal ions from the bath onto the exposed cavity side of the master to form the electroformed secondary master 64. The electroforming bath 66 is an electrolyte selected and provided to effect electrodeposition of a preferred electroforming metal, typically nickel or a suitable nickel alloy.

The electroformed metallic (i.e. nickel) secondary master 64 formed by the electroforming step of FIG. 5 has the opposite gender to the primary female master 48 and is therefore a male master having a male lens mold formation 72 corresponding to, i.e. complementing, the cavity 50 in the primary female master 48. This male formation thus corresponds to the same portion of the intraocular lens 40 to be molded as the cavity 50 in the primary female master 48. In addition to the male lens mold formation 72, the electroformed secondary master 64 has pin and socket formations 74, 76 located at the ends of the male formation 50 and corresponding to the socket and pin formations 62, 60, respectively, of the primary female master 48.

Figure 6:
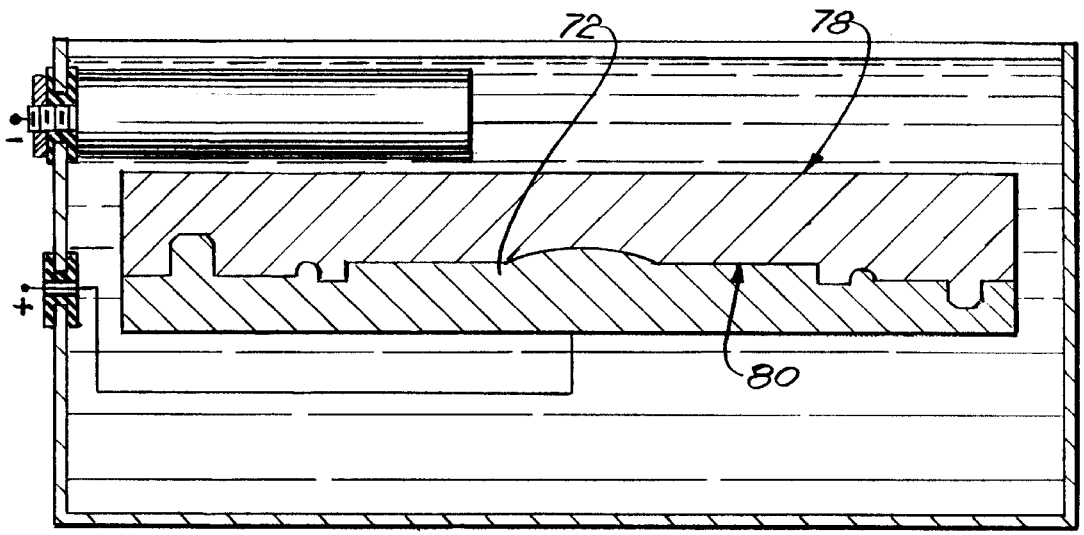
FIG. 6 illustrates a following electroforming step of the preferred method involving electroforming on the secondary male master of FIG. 3*a* tertiary female mold member which is utilized in the subsequent steps of the method as both a final mold member and as tertiary female master.
Figure 7:
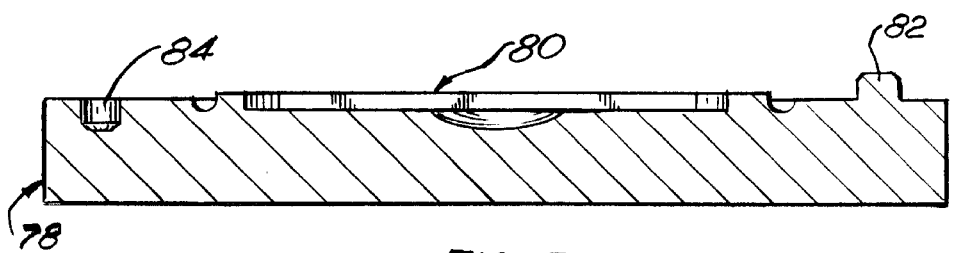
FIG. 7 is a section through the electroformed tertiary mold member produced by the electroforming step of FIG. 6.
Figure 8:
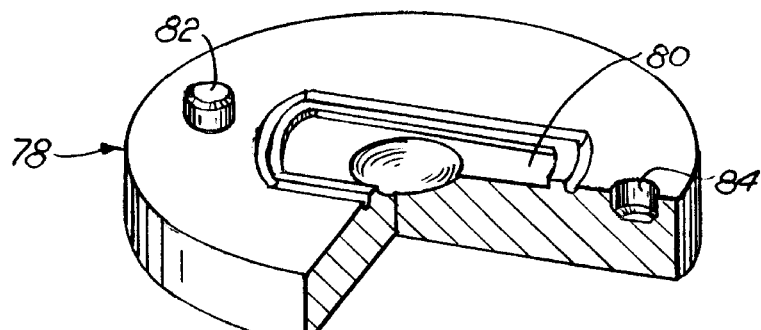
FIG. 8 is a perspective view, partly in section, of the electroformed tertiary female mold member in FIG. 7.

The next step of the present lens mold making method is illustrated in FIG. 6 and involves electroforming a tertiary mold member 78 on the male mold formation side of the secondary male master 64 from the electroforming step of FIG. 5. The electroforming step of FIG. 6 is performed in the same way as that of FIG. 5, except, of course, the primary female master 48 which is used as the master in the step of FIG. 5 is replaced, in the electroforming step of FIG. 6, by the secondary male master 64. The electroformed tertiary member 78 from the electroforming step of FIG. 6 is illustrated in FIGS. 7 and 8 and has the opposite gender to the secondary male master 64. The electroformed tertiary mold member 78 is essentially identical to primary female master 48 except that the electroformed member 78 is a one piece unitary metal part lacking the separate optic pin 54 of master 48.

The electroformed tertiary mold member 78 is thus a female member having a female mold formation 80, i.e. a cavity, corresponding to the male mold formation 72 of the secondary male master 64. This cavity is essentially identical to the cavity 50 in the primary female master 48 and conforms to the same portion of the intraocular lens 40 to be molded as the cavity 50. The electroformed tertiary mold member 78 has pin and socket formations 82, 84 located at the ends of the cavity 80 and corresponding to the pin and socket indexing formations 60, 62 of the primary female master 48.

Figure 9:
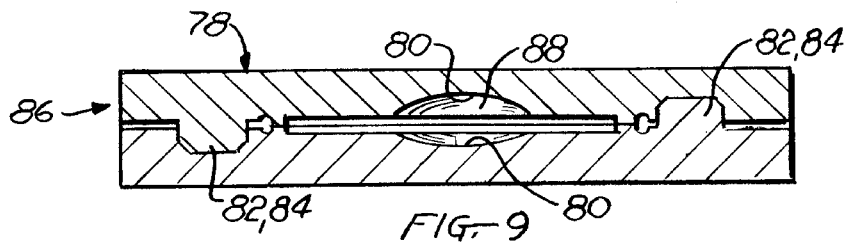
FIG. 9 is a section through a single cavity intraocular lens mold according to the invention whose sides comprise a pair of the electroformed tertiary female mold members in FIGS. 7 and 8.

It should be noted at this point that while the preferred electroforming procedure of the invention described to this point involves the use of a primary female master, electroforming a secondary male master on this primary female master, and then electroforming a tertiary female mold member on the secondary male master, the primary master may be a male master, in which case the electroformed secondary member will be a female member identical to the tertiary female mold member produced by using a primary female master According to one aspect of the invention, the female tertiary mold member 78 may be regarded as a final female mold member which can be assembled face to face with a second identical tertiary mold member and with the two members 78 rotated 180 degrees relative to one another on their common axis to form the two sides of a single cavity intraocular lens mold 86, as shown in FIG. 9. In this case, the electroforming procedure for forming the two female tertiary mold members 78 involves electroforming the single secondary male master 64 of FIG. 5 and then electroforming two tertiary mold members in succession on this same male master in the manner explained earlier. The two electroformed female tertiary members or mold sides 78 are movable to and from their closed positions of FIG. 9 wherein the cavities 80 in the sides form a lens mold cavity 88 conforming to the shape of the intraocular lens to be molded, in this case the symmetrical lens 40 of FIGS. 1 and 2.

Figure 29:
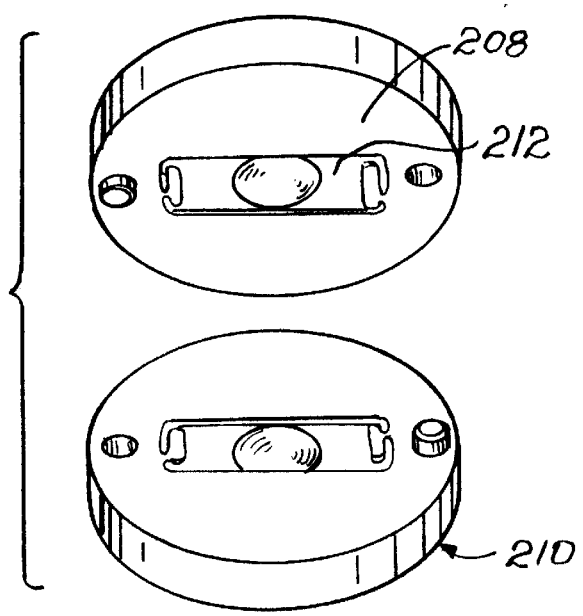
FIG. 29 is a perspective view of two primary female masters for use in the present lens mold making invention when the lens to be molded has a certain lack of symmetry about a median plane containing the optic axis of the lens and the longitudinal centerline of the lens haptics.
Figure 30:
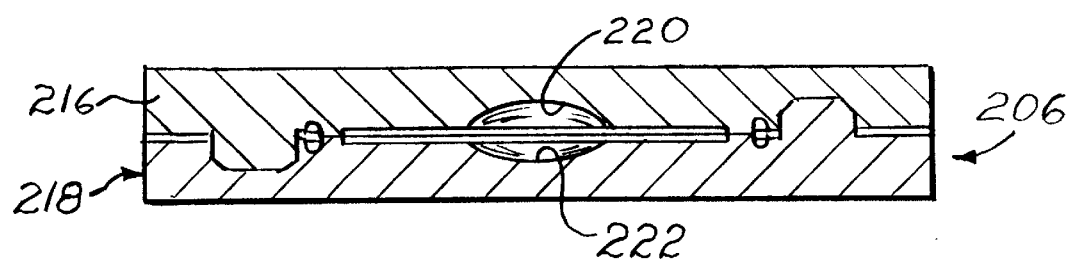
FIG. 30 is a section through two primary female masters for in the practice of the present lens mold making invention when the lens to be molded has a certain lack of symmetry about its median plane transverse to the optic axis of the lens.

As explained later, if the lens to be molded in a single cavity mold like that of FIG. 9 is unsymmetrical about either or both of its median planes P1, P2, the electroforming procedure for forming the female tertiary members which constitute the two mold sides involves the use of a primary master means (46) comprising a pair of primary masters whose cavities differ from one another and correspond to the portions of the unsymmetrical lens at opposite sides, respectively, of its median plane (P1) transverse to its optic axis. In this case, the two dissimilar electroformed mold sides are derived from the two dissimilar primary masters, respectively, of the primary master means in the same manner as described above in connection with the mold sides 78. FIGS. 29 and 30 to be explained later illustrate two such primary master means for unsymmetrical lenses.

According to another aspect of this invention, the present method of making an intraocular lens mold includes the following additional mold making procedure for fabricating multiple cavity intraocular lens molds for molding a plurality (nine in the case of the illustrated embodiments) of intraocular lenses at one time. This additional mold making procedure involves a further electroforming procedure in which electroformed female tertiary mold members like those described above serve as electroforming female masters rather than as final mold members as they do in the single cavity lens mold 86 of FIG. 9. For this reason, the tertiary female mold members are hereafter referred to in places as tertiary female masters or simply female masters.

The next step of the present mold making method, which is the first step of the multiple cavity mold making procedure, involves forming, and in this case electroforming, several tertiary female masters using the initial electroforming procedure described to this point. If the lens to be molded is symmetrical, these several tertiary female masters are identical to and electroformed in the same manner as described above in connection with electroforming the tertiary female mold members 78. If the lens to be molded is unsymmetrical, two groups of tertiary female masters are electroformed, wherein the several tertiary female masters of each group are substantially identical and differ from the tertiary female masters of the other group. The several tertiary female masters of these two groups are electroformed on two corresponding secondary male masters in the same manner as mentioned above in connection with electroforming a pair of female tertiary mold members for the single cavity mold of FIG. 9. In the following description of the multiple cavity mold making procedure, it will be assumed, first, that the lenses to be molded in the multiple cavity mold are symmetrical lenses identical to the lens 40 in FIGS. 1 and 2. The several electroformed female masters used in the multiple cavity mold making procedure are designated by the same reference numeral (78) as the electroformed female mold members in FIG. 9.

The next step of the multiple cavity mold making procedure involves mutually joining the several tertiary female masters 78 to form an assembly of individual masters, that is a master assembly, in which the cavity sides of all the individual female masters are disposed in a common plane at one side of the master assembly. FIGS. 10–13 illustrate one preferred method of mutually joining the several female masters 78. According to this joining method, a dish 89 is provided containing a normally horizontal circular supporting plate 90. The plate is spaced from the bottom of the dish and is disposed in sealing relation to the side wall of the dish. Entering the upper side of the plate are socket-like blind holes 92 equal in number to the tertiary female masters 78 (in this case nine). The holes are uniformly spaced about the plate with one hole located at the center of the plate. Each hole 92 is sized in diameter to removably receive a tertiary female master 78 with a relatively close fit. The tertiary female masters 78 are placed in the holes 92, cavity sides lowermost, so that the cavities 80 in the female masters face the bottoms of the holes. The plate holes have a uniform depth less than the axial dimension or thickness of the female masters 78. Accordingly, the cavity sides of the female masters 78 are located in a common plane parallel to the plate, and the opposite portions of the female masters, hereafter referred to as their posterior portions, project above the upper side of the plate.

Figure 10:
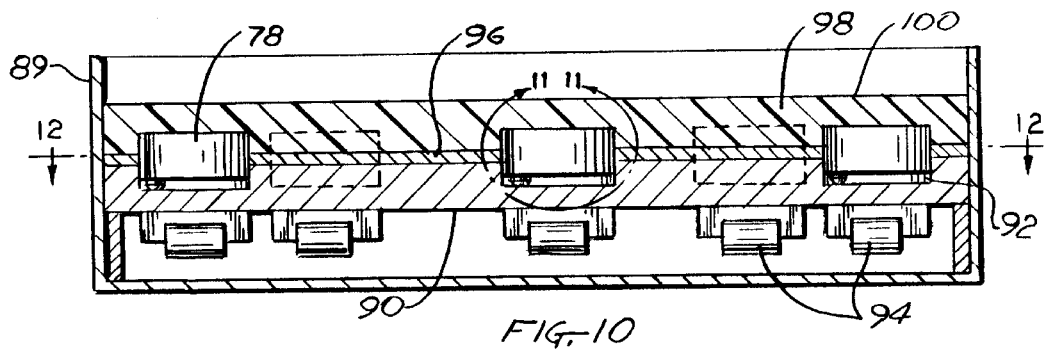
FIG. 10 illustrates a following step of the preferred method involving use several of the tertiary female mold members of FIGS. 7 and 8 as individual tertiary female masters and mutually joining the female masters to form a multiple cavity female master assembly according to the invention.
Figure 11:
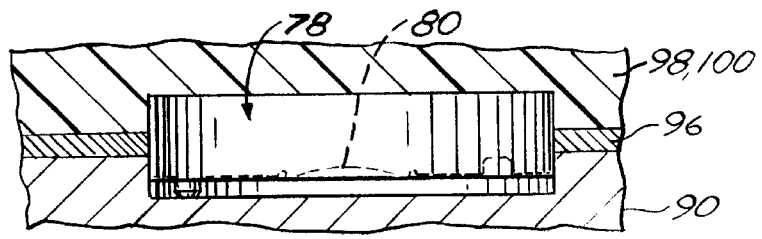
FIG. 11 is an enlargement of the area encircled by the arrow 11—11 in FIG. 10.

Below the plate 90 are magnets 94 for holding the tertiary female masters 78 in the plate holes 92. In this regard, the female masters are electroformed from a metal, preferably nickel, which is magnetically attracted by the magnets. The plate is made of a metal or other material which permits magnetic attraction of the female masters by the magnets. The magnets are spaced about the underside of the plate in a manner to achieve optimum magnetic retention of the female masters 78 in the plate holes 92. On the upper side of the plate 90 is a thin metal separator or barrier plate 96 whose purpose is explained below. This separator plate has holes 97 which receive the posterior portions of the female masters 78 with a tight fit such that the separator plate is in good electrical contact with the female masters. As shown in FIGS. 10 and 12, the posterior portions of the female masters project well above the separator plate.

The several tertiary female masters 78 are mutually joined by pouring into the top of the dish 89 a fluid or liquid bonding compound 98, such as epoxy, to form a layer 100 of the bonding compound which covers the posterior portions of the female masters. This compound is permitted or caused to set and thereby form a supporting base (100) rigidly mounting the female masters. The several individual female masters 78, separator plate 96, and base 100 form a unitary master assembly 102 (FIG. 13). The separator plate 96 prevents the bonding compound 98 from adhering to the supporting plate 90. The cavity sides of the female masters 78 are disposed in a common plane parallel to and located a distance beyond the adjacent side of the separator plate.

The next step of the multiple cavity mold making procedure involves using the master assembly 102 as a multiple cavity female master on which a multiple mold male master 105 is electroformed, as illustrated in FIG. 14. The master assembly 102 is immersed in an electroforming bath 104, and electrical terminals 106 are connected to the metal separator plate 96 of the assembly and in the manner earlier indicated relative to FIG. 5. The multiple mold male master 105 is illustrated in FIG. 15 and has on one side a plurality of male mold formations 110 and indexing pin and socket formations 112, 113 corresponding to the cavities 80 and to the indexing socket and pin formations 84, 82, respectively, of the individual tertiary female masters 78 of the master assembly 102.

Figure 16:
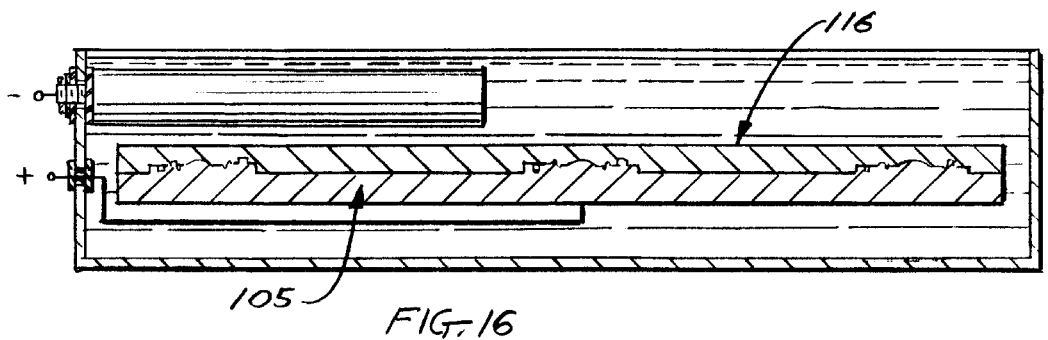
FIG. 16 illustrates a following step of the preferred method involving electroforming a final multiple cavity female mold member on the electroformed multiple mold male master of FIG. 15.
Figure 17:
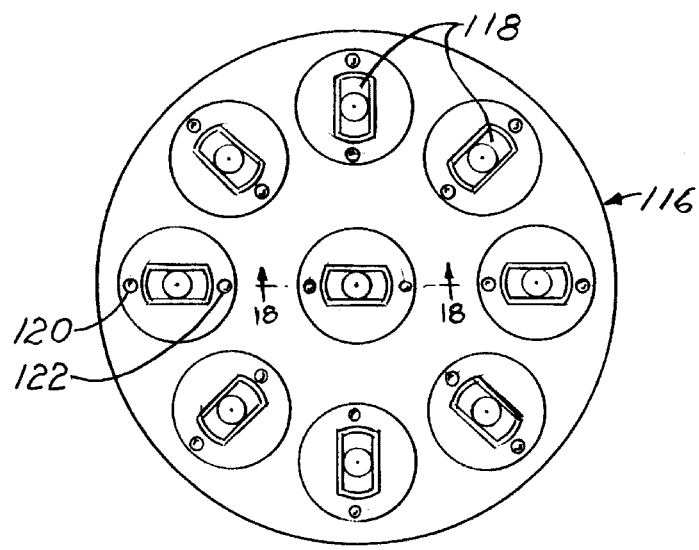
FIG. 17 is a face view of the electroformed final multiple cavity female mold member in FIG. 16.
Figure 18:
FIG. 18 is an enlarged section taken on line 18—18 in FIG. 17.

The following step of the multiple cavity mold making procedure is another electroforming step illustrated in FIG. 16 and involves electroforming on the multiple mold male master 105 from the electroforming step of FIG. 14 a final multiple cavity female mold member 116, best shown in FIGS. 17 and 18. The electroforming step of FIG. 16 is performed in the general manner of the other electroforming steps of the invention. The electroformed final multiple cavity mold member 116 has a plurality of cavities 118 which are arranged in the same pattern as the individual female masters 78 of the master assembly 102. Each cavity 118 is substantially identical to the cavity 50 in the primary female master 46 that serves as the first master of the overall electroforming procedure. At the ends of each cavity 118 of the final electroformed multiple cavity mold member 116 are pin and socket indexing formations 120, 122 substantially identical to those of the primary female master 46.

Figure 21:
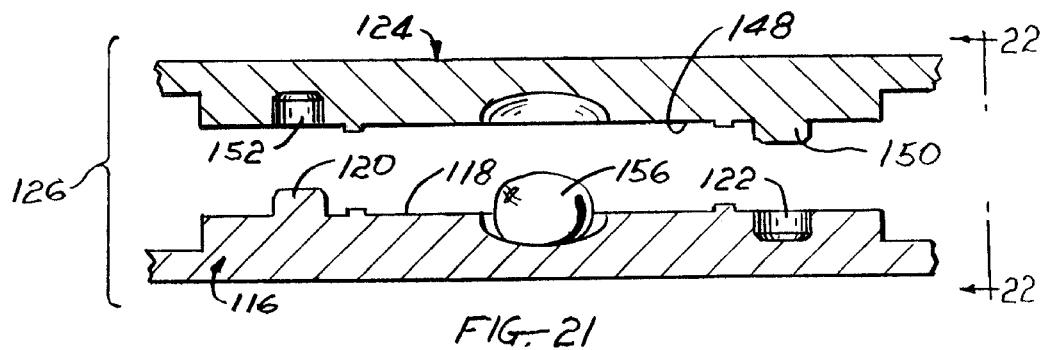
FIG. 21 is an enlarged fragmentary section through a pair of electroformed final multiple cavity female mold members arranged face to face to form the two sides of a multiple cavity intraocular lens mold according to the invention and showing the mold sides in their open positions with a measured quantity of lens molding compound, such as liquid silicone, in a cavity of the lower mold side.
Figure 22:
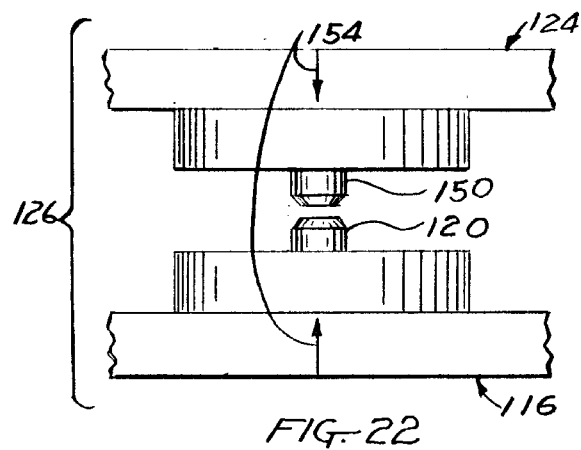
FIG. 22 is a view looking in the direction of the arrow 22—22 in FIG. 21.
Figure 23:
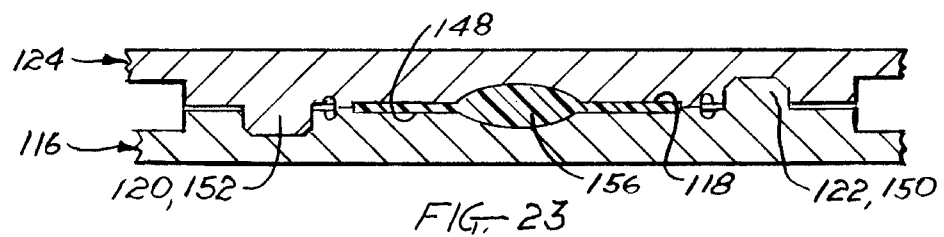
FIG. 23 is a view similar to FIG. 21 showing the mold sides closed.

According to one aspect of the invention, the final electroformed multiple cavity mold member 116 from the preceding electroforming step is utilized to electroform a second final multiple cavity mold member 124, illustrated in FIGS. 21–23, which can be assembled with the final multiple cavity mold member 116 to form the two sides of a multiple cavity lens mold 126. The second final multiple cavity mold member or mold side 124 is formed in the following way.

Figure 19:
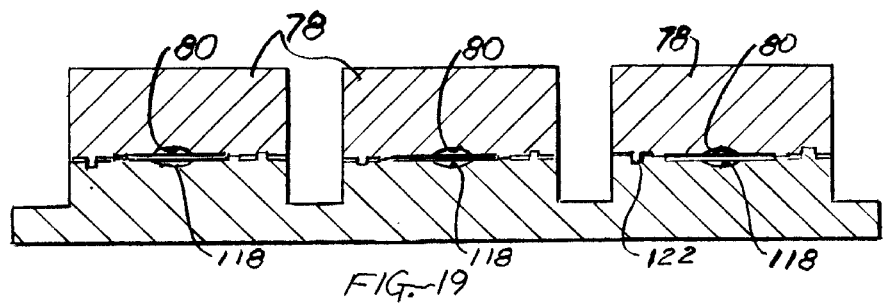
FIG. 19 illustrates a following step of the preferred method involving placement of individual electroformed tertiary female masters on the final electroformed multiple cavity female mold member of FIG. 17.
Figure 20:
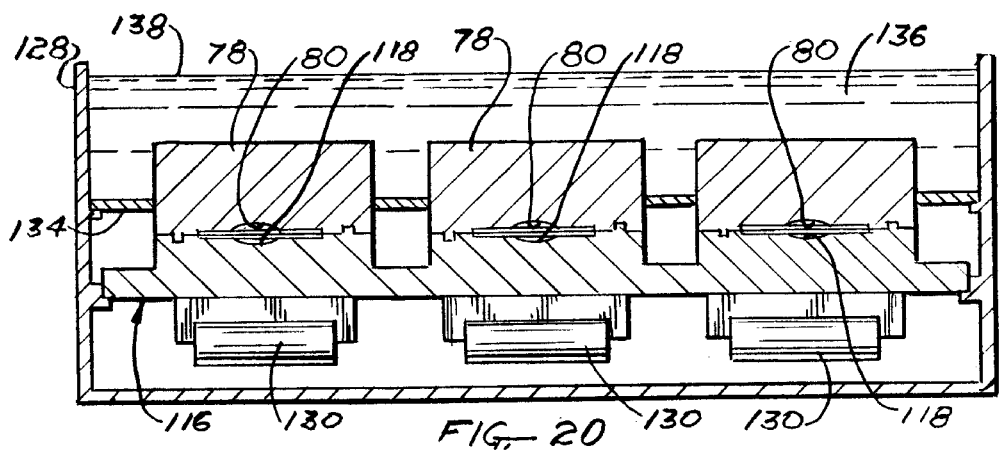
FIG. 20 illustrates a following step of the preferred method involving mutually joining the individual electroformed tertiary female mold masters of FIG. 19 to form a multiple cavity female master assembly utilized to electroform a second male multiple cavity mold from which the final multiple cavity female mold member is electroformed.

Referring to FIGS. 19 and 20, the final electroformed multiple cavity mold member 116 is removably supported in a horizontal position in a dish 128 a distance above the bottom of the dish and in sealing relation to the dish sidewall. Positioned against the underside of the mold member 116 are a plurality of magnets 130. A plurality of individual tertiary female masters 78, equal in number to the mold cavities (nine) in the final multiple cavity mold member 116 are electroformed in the same manner as the individual female masters 78 of the master mold assembly 102. One of these individual female masters 78 is placed on top of each cavity 118 in the multiple cavity mold member 116, as shown in FIG. 19, using their pin and socket index formations 82, 84, 120, 122 to precisely align the cavity 80 in each individual female master 78 with the respective cavity 118 in the multiple cavity mold member 116. The magnets 130 serve to magnetically hold the female masters 78 in place on the mold member 116. A metal separator plate 134 having holes located for precise alignment with and sized to fit snugly over the individual female masters 78 is placed over these masters, as shown in FIG. 20. The circumferential edge of this plate is disposed in sealing relation to the wall of the dish 128.

A bonding compound 136, such as epoxy, is poured into the dish 128 over the individual female masters 78 and the separator plate 134 to form a layer 138 of the compound covering the plate and the posterior portions of the female masters. This compound is allowed or caused to set to form a base (138) rigidly joining the several female masters 78. The joined female masters 78, the separator plate 134, and the base 138 form a second multiple cavity female master assembly 140 having a plurality of coplanar mold cavities 80 located at one side of the assembly. As noted above, these cavities are precisely aligned with the cavities 118 in the final electroformed mold member 116 when the latter mold member and the multiple cavity master 140 are located in their relative positions of FIG. 20.

Figure 24:
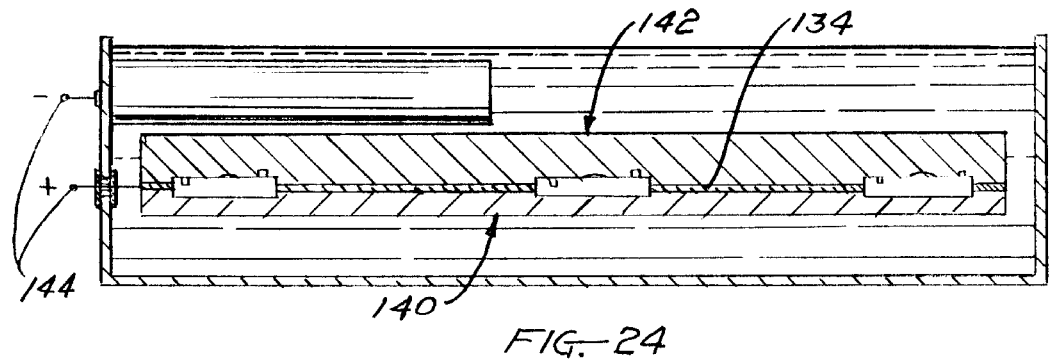
FIG. 24 illustrates a following step of the preferred method involving electroforming a second multiple mold male master on the female master assembly of FIG. 20.
Figure 25:
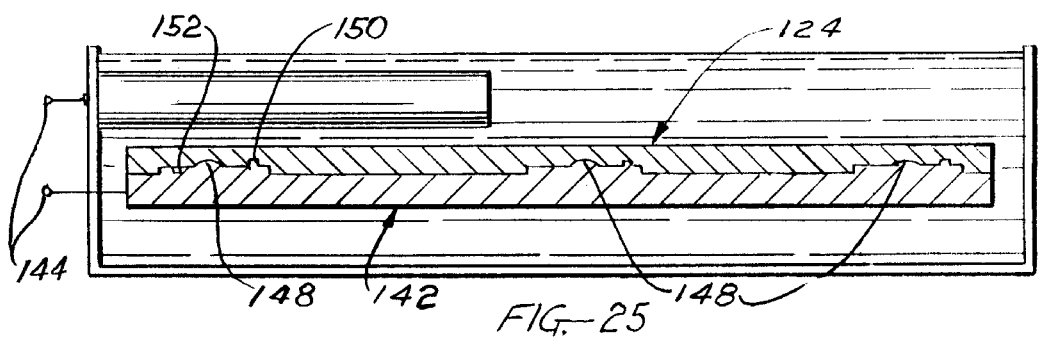
FIG. 25 illustrates a following step of the preferred method involving electroforming a second final multiple cavity female mold member on the electroformed multiple mold male master of FIG. 24.

The next steps in the multiple cavity mold making procedure are illustrated in FIGS. 24 and 25 are essentially identical to the steps of FIGS. 14 and 16. That is to say, the steps of FIGS. 24 and 25 involve electroforming a second multiple mold male master 142 on and corresponding to the multiple cavity female master mold assembly 140 (FIG. 24) and then electroforming on the multiple mold male master 142 (FIG. 25) a second final multiple cavity mold member which constitutes the final multiple cavity mold member 124 of FIGS. 21–23. In the electroforming step of FIG. 24, as in the electroforming steps of FIG. 14, the electrical terminals 144 of the electroforming apparatus are connected to the wall of the electroforming tank 146 and to the separator plate 134 of the multiple mold female master 140, respectively.

Except as noted below, the electroformed final multiple cavity mold member 124 is essentially identical to the final electroformed multiple cavity mold member 116. The mold member 124 has a plurality of cavities 148 which are arranged in the same pattern as the cavities 118 in the mold member 116 and are identical to the latter cavities as well to the cavity 50 in the primary female master 46 that serves as the first master of the overall electroforming procedure. At the ends of each cavity 148 of the final electroformed multiple cavity mold member 124 are pin and socket indexing formations 150, 152. The sole essential difference between the two electroformed final mold members 116, 124 resides in the fact that the indexing pin and socket formations 120, 122, 150, 152 of the two mold members are reverse gender copies of one another as explained below.

The two final electroformed multiple cavity mold members 116, 124 are adapted to be assembled face to face to form the two sides of the multiple cavity intraocular lens mold 126 of FIGS. 21–23. The two mold members are thus assembled face to face in mutual coaxial relation and in relative angular positions about their common axis which correspond to the relative angular positions occupied by the multiple mold female master assembly 140 and the electroformed multiple mold male master 142 in FIG. 24 and those occupied by the multiple mold male master 142 and the electroformed final multiple cavity mold member 124 in FIG. 25.

As mentioned above, the sole difference between the two final multiple cavity mold members 116, 124 resides in the fact that their indexing pin and socket formations 120, 122, 150, 152 are reverse gender copies of one another. That is to say, because of the way in which the two final mold members are formed, the indexing pins 120 or 150 of each final mold member are coaxially aligned with corresponding indexing sockets 122 or 152 in the other final mold member when these members are assembled face to face in the relative positions just stated. When the final mold members are closed (FIG. 23), these corresponding indexing pins and sockets engage to precisely align the corresponding cavities 118, 148 in the members. The two final mold members may have index marks 154 (FIG. 22) to facilitate placement of the two mold members in these relative positions.

From the description to this point, it will be understood that the two electroformed final multiple cavity mold members or mold sides 116, 124 have a plurality of pairs of corresponding cavities 118, 148 each including a first cavity in one side and a corresponding second cavity in the other side. Each cavity 118, 148 is substantially identical to the cavity 50 in the primary female master 46 of FIG. 3 and conforms to the portion of the lens 40 of FIG. 1 at either side of its median plane P1. When the mold sides 116, 124 are closed (FIG. 23), the two corresponding cavities of each cavity pair form a mold cavity 154 conforming to the shape of the intraocular lens 40.

Intraocular lenses 40 are molded in the multiple cavity mold 126 by opening the mold and placing a measured volume of a suitable liquid lens molding compound 156, such as liquid silicone, in each cavity of the lower mold side, in this case each cavity 118 of the mold side 116, as shown in FIG. 21. The volume of liquid placed in each cavity 118 is measured to exceed by a certain amount the volume of the cavity. Owing to surface tension and viscosity, the liquid overfills but does not overflow the cavity, somewhat in the manner depicted in FIG. 21. The two mold sides are then closed to confine the liquid in the lens shaped molding cavities 156 formed by the corresponding cavities in the two mold sides while the liquid in each mold cavity sets to form a molded lens 40.

In the intraocular lens mold 126 described above, the cavities 118, 148 in each mold side 116, 124 are fixed in position relative to the respective mold side, and precise alignment of the corresponding cavities in the two mold sides is achieved by means of the described electroforming procedure used to form the two sides and interengagement of the indexing formations on the two sides. FIG. 26 illustrates a modified multiple cavity intraocular lens mold 158 according to the invention including two multiple cavity mold members or mold sides 160, 162 having multiple-pairs of corresponding cavities 164, 166, respectively, and wherein precise alignment of the two corresponding cavities of each cavity pair is accomplished mechanically when the mold closes.

The multiple cavity mold side 160 is a final electroformed multiple cavity mold member which is identical to either one of those of FIGS. 18–25 and is formed by the electroforming procedure described in connection with the latter figures. Accordingly, it is unnecessary to describe the mold side 160 in detail. Suffice it to say that this mold side has a plurality (nine) of mold formations 165 on its upper face each including a cavity 164 and an indexing pin 168 and indexing socket 170 at opposite ends of the cavity.

Mold side 162 includes a supporting plate 172 containing bores 174 equal in number (nine) to the mold formations 165 on the mold side 160 and located so as to be aligned with the mold formations, respectively, when the two mold sides are disposed in their lens mold forming relation of FIG. 26. Rotatably positioned and restrained against axial movement in each bore 174 is an individual female mold part 176 including an upper journal 178 which is rotatable in the respective bore and fixed against axial movement in the bore by the illustrated engaging shoulders on the journal and wall of the respective bore. Fixed on the lower end of each journal 178 is an electroformed tertiary female mold member 180 which is identical to the mold member 78 of FIG. 8 and hence need not be described in detail. Suffice it to say that each mold member 180 has a mold cavity 166 and an indexing pin 182 and socket 184 at opposite ends of the cavity.

The mold sides 160, 162 are constructed and arranged so that when these sides close to mold a lens, the indexing pins 168, 182 and indexing sockets 170, 184 interengage to precisely align the corresponding mold cavities 164, 166 in the two sides. It will be understood, of course, that in order for this inter engagement to occur during closing of the mold, the rotatable mold members 176 must be located, prior to closure, in approximately the positions they occupy when the mold sides are closed. To this end, the mold plate 172 and each mold part 176 have index marks 186 to permit proper manual positioning of the mold members prior to closing of the mold. The mold members 176 are free to rotate as necessary to permit inter engagement of the indexing pins and sockets during closure of the mold. The mold 158 is used in the same way as the mold 126. The two mold sides may have index marks 189 for bodily aligning the sides in the proper positions about their common axis.

FIGS. 27 and 28 illustrate a modified mold side 190 which can be used in the mold of FIG. 26 in place of the upper mold side 162 in the latter figure. The modified mold side 190 has a supporting plate 191 containing a plurality blind holes 192 in one side which are equal in number (nine) to and located for coaxial alignment with the mold formations 165 on the lower mold side 160 in FIG. 26 when the mold sides 160, 190 are disposed in the same mold forming relation as the mold sides in FIG. 26. Positioned within each blind hole 192 is an electroformed mold part 194 which is identical to the tertiary female mold member 78 of FIG. 8 and hence need not be described in detail. Suffice it to say that each mold part 194 has a mold cavity 196 and an indexing pin 198 and socket 200 at opposite ends of the cavity. Each mold part 194 is attached to the bottom of its respective blind hole 192 by a torsionally resilient coupling pad 202.

The mold side 190 is constructed and arranged so that when this side and the mold side 160 of FIG. 26 are assembled face to face to form an intraocular lens mold and the mold sides are closed to mold a lens, the corresponding indexing pins 168, 198 and indexing sockets 170, 200 interengage to precisely align the corresponding mold cavities 164, 196 in the two sides. As in FIG. 26, in order for this inter engagement to occur during closing of the mold sides, the resiliently mounted mold members 194 must be located, prior to closure, in approximately the positions they occupy when the mold sides are closed. This is accomplished by the torsionally resilient coupling pads 202 which locate the mold parts 194 in approximately the proper positions relative to the mold plate 191 when the pads are in their normal unstressed condition. The couping pads yield torsionally during closure of the mold sides to permit inter engagement of the indexing pins and sockets, A mold comprising the two mold sides 160, 190 is used in the same way as the molds 126 and 158.

FIGS. 29 and 30 illustrate examples of mold means 204, 206 according to the invention for use in practicing the mold making method of this invention when the intraocular lens to be molded is unsymmetrical about either or both its median plane transverse to its optic axis (plane P1 in FIG. 2) and/or its median plane containing the optic axis and the longitudinal centerline of the lens haptics (plane P2 in FIG. 1). For simplicity of illustration, in the following discussion of FIGS. 29 and 30, it will be assumed, first, that each figure illustrates primary female master mold means for use in place of the primary female master mold means 46 of FIG. 3 when the lens to be molded is unsymmetrical, and, secondly, that each figure illustrates a pair of female tertiary mold members or masters or derived from the two primary masters, respectively. In this regard, it will be understood from the description to this point that primary female masters and tertiary female masters or mold members derived from the primary masters look the same when viewed in the manner depicted in FIGS. 29 and 30.

Under the first assumption above, the mold means of FIG. 29 is regarded as illustrating a primary female master mold means for use, in place of the primary female master mold means 46 of FIG. 3, in making a mold according to the invention for molding a lens which is unsymmetrical about its median plane P2 by virtue of having haptics with oppositely directed spring fingers at their ends. In this case, the primary female master mold means comprises a pair of primary female masters 208, 210 having cavities 212, 214 which are mirror images of one another. Except for this difference, each of the masters 208, 210 is identical to the primary female master 46 of FIG. 3. Again considering the first assumption above, FIG. 30 is regarded as illustrating a primary female master mold means 206 for use in place of the primary female master mold means 46 when the lens to be molded is unsymmetrical about its median plane P1 by virtue of having an optic with differing anterior and posterior surface curvatures. In this case, the primary female master mold means comprises a pair of primary female masters 216, 218 having cavities 220, 222 which are identical except for differing curvatures of the of the optic forming surfaces of the cavities.

As discussed earlier, when making a mold according to this invention for molding a symmetrical lens, the electroforming procedure involves the use of a primary female master mold means (46) consisting of a single primary female master and electroforming on this single female primary master a single secondary male master which is then utilized as the master on which are electroformed both tertiary female mold members or sides 78 of the single cavity mold 86 in FIG. 9 as well as all of the tertiary female mold members 78 used in making the multiple cavity molds of FIGS. 21–23 and FIGS. 26–28.

When making a mold for molding an unsymmetrical lens, the electroforming procedure involves the use of a primary female master mold means comprising a pair of dissimilar primary female masters, such as those of FIGS. 29 or 30, and electroforming on each female primary master a secondary male master to provide a pair of secondary male masters with different cavity configurations. This pair of dissimilar primary masters are then utilized as the secondary male masters on which are electroformed the tertiary female mold members which form the two sides of a single cavity lens mold similar to the lens mold 86 in FIG. 9 as well as all of the tertiary female mold members used in making multiple cavity molds similar to those of FIGS. 21–23 and FIGS. 26–28. The tertiary female mold members utilized as the two sides of a single cavity mold are derived from the two dissimilar primary female masters, respectively. Similarly, the two groups of tertiary female masters utilized in the electroforming procedure for making the two sides of a multiple cavity mold are derived from the two dissimilar primary female masters, respectively. That is to say, one group of tertiary female masters derived from one primary female master are used in the mold joining and electroforming steps of FIGS. 10–13. Another group of tertiary female masters derived from the other primary female master are used in the mold joining steps of FIGS. 19, 20 and the corresponding electroforming steps. In the multiple cavity molds of FIGS. 26–28, the tertiary mold members used on the mold side comprising individual molds are derived from a different primary female master than that from which the other electroformed multiple cavity mold side is derived.

Under the second assumption above concerning FIGS. 29 and 30, each of these figures is regarded as illustrating a single cavity mold which is used in the same manner as the single cavity mold of FIG. 9 for molding unsymmetrical lenses. In this case, the two mold members illustrated in each figure form the two sides of the respective mold.

Thus there has been shown and described novel methods of fabricating intraocular lenses which fulfill all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. In a method of making a mold for molding a lens, the steps comprising:

providing primary electroforming master means comprising one of the following (a), (b): (a) a single primary electroforming master including a first mold formation at one side of the master which conforms to a certain portion of the lens and complementary male and female indexing formations at said one side of the master, (b) a pair of primary electroforming masters including a second mold formation at one side of one master of said pair and a third mold formation at one side of the other master of said pair which conform to two different portions, respectively, of said lens, and complementary male and female indexing formations at said one side of each master of said pair, performing the following electroforming procedure (c) when said master means comprises said single primary master and the following electroforming procedure (d) when said master means comprises said pair of primary masters: (c) electroforming on said one side of said single primary master an electroformed secondary master having at one side an electroformed mold formation which is a reverse gender replica of the mold formation on said single primary master and electroforming indexing formations which are reverse gender replicas of said male and female indexing formations, respectively, on said single primary master, and electroforming on said one side of said electroformed secondary master at least one electroformed member having at one side an electroformed mold formation which is a same gender replica of the mold formation on said single primary master and electroformed male and female indexing formations which are same gender replicas of said male and female indexing formations, respectively, on said single primary master, (d) electroforming on said one side of each primary master of said pair of primary masters an electroformed secondary master to form a pair of electroformed secondary masters each having at one side an electroformed mold formation which is a reverse gender replica of the electroformed mold formation on the respective primary master of said primary master pair and electroformed indexing formations which are reverse gender replicas of said male and female indexing formations on the respective primary master of said primary master pair and electroforming on said one side of each secondary master of said secondary master pair at least one electroformed member having at one side an electroformed mold formation which is a same gender replica of the mold formation of the respective primary master of said primary master pair, and electroformed male and female indexing formations which are same gender replicas of said male and female indexing formations, respectively, on the respective primary master of said primary master pair.

2. In a method of making a mold for molding a lens, the steps comprising:

providing electroforming master means comprising one of the following (a), (b): (a) a single electroforming master including a first mold formation at one side of the master which is a same gender replica of a certain portion of the lens, (b) a pair of electroforming masters including a second mold formation at one side of one master of said pair and a third mold formation at one side of the other master of said pair which are same gender replicas two different portions, respectively, of said lens, performing the following electroforming procedure (c) when said master means comprises said single master and the following electroforming procedure (d) when said master means comprises said pair of masters: (c) electroforming in succession on said one side of said single master a plurality of discrete electroformed first mold members each devoid of any connection to any other electroformed first mold member and each having at one side an electroformed mold formation which is a reverse gender replica of the mold formation on said single master, (d) electroforming in succession on said one side of each master of said pair of masters a plurality of discrete second mold members each devoid of any connection to any other second mold member and each having at one side an electroformed mold formation which is a reverse gender replica of the mold formation on the respective master, and thereafter performing the following additional step (e) when said master means comprises said single master and the following step (f) when said master means comprises said pair of masters:

(e) mutually joining the plurality of discrete first mold members electroformed on said single master to form a first mold assembly wherein the electroformed mold formations of the mold members in the assembly are located at one side of the assembly, (f) mutually joining the plurality of formed discrete second mold members electroformed on each master of said master pair to form a pair of second mold assemblies wherein the electroformed mold formations of the mold members in each second mold assembly are located at one side of the respective assembly.

3. The method of claim 2 wherein:

each said discrete electroformed mold member has a posterior portion opposite said one side of the respective mold member, and each said step of mutually joining discrete electroformed mold members involves securing the posterior portions of the respective discrete electroformed mold members to a supporting base.

4. In a method of making a mold for molding a lens, the steps comprising:

providing electroforming master means comprising one of the following (a), (b): (a) a single electroforming master including a first mold formation at one side of the master which is a same gender replica of one portion of the lens, (b) a pair of electroforming masters including a second mold formation at one side of one master of said pair and a third mold formation at one side of the other master of said pair which are same gender replicas of two different portions, respectively, of said lens, performing the following electroforming procedure (c) when said master means comprises said single master and the following electroforming procedure (d) when said master means comprises said pair of masters: (c) electroforming in succession on said one side of said single master a plurality of discrete first mold members each devoid of any connection to any other first mold member and each having at one side an electroformed mold formation which is a reverse gender replica of the mold formation on said single master, (d) electroforming in succession on said one side of each master of said pair of masters a plurality of discrete second mold members each devoid of any connection to any other second mold member and each having at one side an electroformed mold formation which is a reverse gender replica of the mold formation of the respective master, and thereafter performing the following additional steps (e) when said master means comprises said single master and the following steps (f) when said master means comprises said pair of masters:

(e) mutually joining the plurality of formed discrete first mold members electroformed on said single master to form a first master mold assembly wherein said electroformed mold formations of the mold members in the assembly are located at one side of the assembly, and electroforming on said one side of said first master mold assembly a multiple mold member having at one side a plurality of mold formations which are reverse gender replicas of the mold formations of said master mold assembly (f) mutually joining the plurality of formed discrete second mold members electroformed on each master of said master pair to form a pair of second master mold assemblies wherein the electroformed mold formations of the mold members in each second master mold assembly are located at one side of the respective assembly, and electroforming on said one side of each second master mold assembly a multiple mold member having at one side a plurality of mold formations which are reverse gender replicas of the electroformed mold formations of the respective second master mold assembly.

5. In a method of making a mold for molding a lens, the steps comprising:

providing electroforming master means comprising one of the following (a), (b): (a) a single electroforming master including a first mold formation at one side of the master which is a same gender replica of one portion of the lens, (b) a pair of electroforming masters including a second mold formation at one side of one master of said pair and a third mold formation at one side of the other master of said pair which are same gender replicas of two different portions, respectively, of said lens, performing the following electroforming procedure (c) when said master means comprises said single master and the following electroforming procedure (d) when said master means comprises said pair of masters: (c) electroforming in succession on said one side of said single master a plurality of discrete first mold members each devoid of any connection to any other first mold member and each having at one side an electroformed mold formation which is a reverse gender replica of the mold formation on said single master, (d) electroforming in succession on said one side of each master of said pair of masters a plurality of discrete second mold members each devoid of any connection to any other second mold member and each having at one side an electroformed mold formation which is a reverse gender replica of the mold formation on the respective master, and thereafter performing the following additional steps (e) when said master means comprises said single master and the following steps (f) when said master means comprises said pair of masters:

(e) mutually joining the plurality of formed discrete first mold members electroformed on said single master to form a first master mold assembly wherein the electroformed mold formations of the mold members in the assembly are located at one side of the assembly, electroforming on said one side of said master mold assembly a multiple mold master having at one side a plurality of mold formations which are reverse gender replicas of the electroformed mold formations of the mold members in the master mold assembly, and electroforming on said one side of said multiple mold master a final multiple mold member having at one side a plurality of final mold formations which are reverse gender replicas of the mold formations of said multiple mold master, (f) mutually joining the plurality of formed discrete second mold members electroformed on each master of said master pair to form a pair of second master mold assemblies wherein the electroformed mold formations of the mold members in each second master mold assembly are located at one side of the respective master mold assembly, electroforming on said one side of each second master mold assembly a second multiple mold master having at one side a plurality of mold formations which are reverse gender replicas of the mold formations of the respective master mold assembly, and electroforming on said one side of each second multiple mold master a final multiple mold member having at one side a plurality of final mold formations which are reverse gender replicas of the mold formations of the respective multiple mold master.

6. In a method of making a mold for molding a lens, the steps comprising:

providing electroforming master means comprising one of the following (a), (b): (a) a single electroforming master including a first mold formation at one side of the master which is a same gender replica of one portion of the lens, (b) a pair of electroforming masters including a second mold formation at one side of one master of said pair and a third mold formation at one side of the other master of said pair which are same gender replicas of two different portions, respectively, of said lens, performing the following electroforming procedure (c) when said master means comprises said single master and the following electroforming procedure (d) when said master means comprises said pair of masters: (c) electroforming on said one side of said single master a plurality of individual first mold members each having at one side an electroformed mold formation which is a reverse gender replica of the mold formation on said single master, (d) electroforming on said one side of each master of said pair of masters a plurality of individual mold members each having at one side an electroformed mold formation which is a reverse gender replica of the mold formation of the respective master, and performing the following additional steps (e) when said master means comprises said single master and the following additional steps (f) when said master means comprises said pair of masters:

(e) mutually joining a plurality of said individual mold members electroformed on said single master to form a first master mold assembly wherein the electroformed mold formations of the mold members in the assembly are located at one side of the assembly, electroforming on said one side of said master mold assembly a multiple mold master having at one side a plurality of mold formations which are reverse gender replicas of the mold formations of the master mold assembly, electroforming on said one side of said multiple mold master a first final mold member having at one side a plurality of final mold formations which are reverse gender replicas of the mold formations of said multiple mold master, and forming a second final mold member having at one side mold formations corresponding to and substantially identical to the mold formations of said first final mold member and arranged on the second final mold member so that the two final mold members may be placed face to face to form the two sides of a multiple cavity lens mold for molding lenses, (f) mutually joining a plurality of said individual mold members electroformed on one master of said master pair to form a second master mold assembly wherein the electroformed mold formations of the mold members in the respective second master mold assembly are located at one side of the last mentioned assembly, electroforming on said one side of the last mentioned master mold assembly a multiple mold master having at one side a plurality of mold formations which are reverse gender replicas of the mold formations of the last mentioned master mold assembly, electroforming on said one side of the last mentioned multiple mold master a first final multiple mold member having at one side mold formations which are reverse gender replicas of the mold formations of the last mentioned multiple mold master, and forming a second final mold member having at one side mold formations each substantially identical to the mold formation of a said individual mold member electroformed on the other master of said master pair and arranged on said last mentioned second final mold member so that the last mentioned first and second final mold members may be placed face to face to form the two sides of a multiple cavity lens mold for molding lenses.

7. In a method of making a mold for molding a lens, the steps comprising:

providing electroforming master means comprising one of the following (a), (b): (a) a single electroforming master including a first mold formation at one side of the master which is a same gender replica of one portion of the lens, (b) a pair of electroforming masters including a second mold formation at one side of one master of said pair and a third mold formation at one side of the other master of said pair which are same gender replicas of two different portions, respectively, of said lens, performing the following electroforming procedure (c) when said master means comprises said single master and the following electroforming procedure (d) when said master means comprises said pair of masters: (c) electroforming on said one side of said single master a plurality of individual mold members each having at one side an electroformed mold formation which is a reverse gender replica of the mold formation on said single master, (d) electroforming on said one side of each master of said pair of masters a plurality of individual mold members each having at one side an electroformed mold formation which is a reverse gender replica of the mold formation of the respective master, and performing the following additional steps (e) when said master means comprises said single master and the following additional steps (f) when said master means comprises said pair of masters:

(e) mutually joining a plurality of said individual mold members electroformed on said single master to form a first master mold assembly wherein the electroformed mold formations of the mold members in the assembly are located at one side of the assembly, electroforming on said one side of said master mold assembly a first multiple mold master having at one side a plurality of mold formations which are reverse gender replicas of the mold formations of the master mold assembly, electroforming on said one side of said multiple mold master a first final mold member having at one side a plurality of final mold formations which are reverse gender replicas of the mold formations of said multiple mold master, placing individual mold members electroformed on said single master over the mold formations of said final mold member in such a way that the electroformed mold formation of each last mentioned individual mold member is aligned with the respective mold formation of the final mold member, mutually joining the several last mentioned individual mold members to form a second master mold assembly having a plurality of electroformed mold formations at one side, electroforming on said one side of said second master mold assembly a second multiple mold master having at one side a plurality of mold formations which are reverse gender replicas of the mold formations of said second master mold assembly, and electroforming on said one side of said second multiple mold master a second final mold member having at one side final mold formations corresponding to and substantially identical to the final mold formations of said first final mold member and arranged on the second final mold member so that the two final mold members may be placed face to face to form the two sides of a multiple cavity lens mold for molding lenses, (f) mutually joining a plurality of said individual mold members electroformed on one master of said master pair to form a third master mold assembly wherein the electroformed mold formations of the several individual mold members in the respective assembly are located at one side of the respective assembly, electroforming on said one side of said third master mold assembly a third multiple mold master having at one side a plurality of mold formations which are reverse gender replicas of the mold formations of said third master mold assembly, electroforming on said one side of said third multiple mold master a third final mold member having at one side a plurality of mold formations which are reverse gender replicas of the mold formations of said third multiple mold master, placing over the mold formations of said third final mold member individual mold members which have been electroformed on the other master of said master pair in such a way that the mold formation of each last mentioned individual mold member is aligned with the respective mold formation of said third final mold member, mutually joining the several last mentioned individual mold members to form a fourth master mold assembly wherein the electroformed mold formations of the last mentioned individual mold members are located at one side of said fourth master mold assembly, electroforming on said one side of said fourth master mold assembly a fourth multiple mold master having at one side a plurality of mold formations which are reverse gender replicas of the mold formations of said fourth master mold assembly, and electroforming on said one side of said fourth multiple mold master a a fourth final multiple mold member having at one side mold formations which are reverse gender replicas of the mold formations of said fourth multiple mold master and arranged on the fourth final multiple mold member so that the third and fourth final mold members may be placed face to face to form the two sides of a multiple cavity lens mold for molding lenses.

8. The method of claim 7 wherein said step of providing said electroforming master means comprises:

providing one of the following (a), (b): (a) a single primary female master including a first cavity at one side of said single primary female master corresponding to said one portion of the lens, (b) a pair of primary female masters including a second cavity at one side of one master of said pair of primary female masters and a third cavity at one side of the other master of said pair of primary female masters corresponding to said two different portions, respectively, of said lens, and performing one of the following electroforming procedures (c), (d): (c) electroforming on said single primary female master a secondary male master which has a male mold formation corresponding to said cavity in said single primary female master and which constitutes said single electroforming master, (d) electroforming on said primary female masters of said primary female master pair secondary male masters which have male mold formations, respectively, corresponding to the cavities in the respective primary female masters of said female master pair and which constitute said pair of electroforming masters.

9. In a method of making a mold for molding a lens, the steps comprising:

providing electroforming master means comprising one of the following (a), (b): (a) a single electroforming master including a first mold formation at one side of the master which is a same gender replica of one portion of the lens, (b) a pair of electroforming masters including a second mold formation at one side of one master of said pair and a third mold formation at one side of the other master of said pair which are same gender replicas of two different portions, respectively, of said lens, performing the following electroforming procedure (c) when said master means comprises said single master and the following electroforming procedure (d) when said master means comprises said pair of masters: (c) electroforming on said one side of said single master a plurality of individual first mold members each having at one side an electroformed mold formation which is a reverse gender replica of the mold formation on said single master, (d) electroforming on said one side of each master of said pair of masters a plurality of individual mold members each having at one side an electroformed mold formation which is a reverse gender replica of the mold formation of the respective master, and performing the following additional steps (e) when said master means comprises said single master and the following additional steps (f) when said master means comprises said pair of masters:

(e) mutually joining a plurality of said individual mold members electroformed on said single master to form a first master mold assembly wherein the electroformed mold formations of the several individual mold members are located at one side of the assembly, electroforming on said one side of said master mold assembly a multiple mold master having at one side a plurality of mold formations which are reverse gender replicas of the mold formations of said assembly, electroforming on said one side of said multiple mold master a first final multiple mold member having at one side a plurality of mold formations which are reverse gender replicas of the mold formations of said multiple mold master, and mounting a second plurality of said individual mold members electroformed on said single master on a supporting base for limited movement relative to the base to form a second final multiple mold member wherein the mold formations of said second plurality of mold members are located at one side of the second final mold member so that the first and second final multiple mold members may be placed face to face to form the two sides of a multiple cavity lens mold for molding lenses, (f) mutually joining a plurality of said individual mold members electroformed on one master of said master pair to form a second master mold assembly wherein the mold formations of the several individual mold members in the respective assembly are located at one side of the respective assembly, electroforming on said one side of said second master mold assembly a second multiple mold master having at one side a plurality of mold formations which are reverse gender replicas of the mold formations of said second master mold assembly, electroforming on said one side of said second multiple mold master a third final multiple mold member having at one side mold formations which are reverse gender replicas of the mold formations of said second multiple mold master, and mounting a plurality of said individual mold members electroformed on the other master of said master pair on a supporting base for limited movement relative to the base to form a fourth final multiple mold member wherein the mold formations of the last mentioned individual mold members are located at one side of the fourth final multiple mold member so that said third and fourth final multiple mold members may be placed face to face to form the two sides of a multiple cavity lens mold for molding lenses.

10. The method of claim 9 wherein said step of providing said electroforming master means comprises:

providing one of the following (a), (b): (a) a single primary female master including a first cavity at one side of said single primary female master corresponding to said one portion of the lens, (b) a pair of primary female masters including a second cavity at one side of one master of said pair of primary female masters and a third cavity at one side of the other master of said pair of primary female masters corresponding to said two different portions, respectively, of said lens, and performing one of the following electroforming procedures (c), (d): (c) electroforming on said single primary female master a secondary male master which has a male mold formation corresponding to said cavity in said single primary female master and which constitutes said single electroforming master, (d) electroforming on said primary female masters of said primary female master pair secondary male masters which have male mold formations, respectively, corresponding to the cavities in the respective primary female masters of said female master pair and which constitute said pair of electroforming masters.

11. The method of claim 10 wherein:

each said individual electroformed mold member has a posterior portion opposite said one side of the respective mold member, and each said step of mutually joining individual electroformed mold members involves securing the posterior portions of the respective mold members to a supporting base.

12. The method of claim 10 wherein:

each said individual electroformed mold member has a posterior portion opposite said one side of the respective mold member, and each said step of mutually joining individual electroformed mold members involves contacting the posterior portions of the respective mold members with a layer of liquid bonding compound which sets to form a supporting base supporting the respective mold members.

13. The method of claim 9 wherein:

each said individual electroformed mold member has a posterior portion opposite said one side of the respective mold member, and each said step of mutually joining individual electroformed mold members involves securing the posterior portions of the respective mold members to a supporting base.

14. The method of claim 9 wherein:

each said individual electroformed mold member has a posterior portion opposite said one side of the respective mold member, and each said step of mutually joining individual electroformed mold members involves contacting the posterior portions of the respective mold members with a layer of liquid bonding compound which sets to form a supporting base supporting the respective mold members.

15. In a method of making a mold for molding an intraocular lens including a central optic and haptics spaced circumferentially about and extending outwardly from said optic, the steps comprising:

providing electroforming master means comprising one of the following (a), (b): (a) a single electroforming master including a first mold formation at one side of the master which conforms to a certain portion of the lens optic and haptics, (b) a pair of electroforming masters including a second mold formation at one side of one master of said pair and a third mold formation at one side of the other master of said pair which conform to two different portions, respectively, of said lens optic and haptics, performing the following electroforming procedure (c) when said master means comprises said single master and the following electroforming procedure (d) when said master means comprises said pair of masters: (c) electroforming on said one side of said single master at least one individual first mold member having at one side an electroformed mold formation which is a reverse gender replica of the mold formation on said single master, (d) electroforming on said one side of each master of said pair of masters at least one individual mold member having at one side an electroformed mold formation which is a reverse gender replica of the mold formation of the respective master, and wherein said step of providing said electroforming master means comprises:

providing one of the following (e), (f): (e) a single primary female master including at one side a first cavity corresponding to said one portion of the lens optic and haptics, (f) a pair of primary female masters including a second cavity at one side of one master of said pair of primary female masters and a third cavity at one side of the other master of said pair of primary female masters corresponding to said two different portions, respectively, of said lens optic and haptics, and performing one of the following electroforming procedures (g), (h): (g) electroforming on said single primary female master a secondary male master which has a male mold formation corresponding to said cavity in said single primary female master and which constitutes said single electroforming master, (h) electroforming on said primary female masters of said primary female master pair secondary male masters respectively, which have male mold formations, respectively, corresponding to the cavities in the respective primary female masters of said female master pair and which constitute said pair of electroforming masters.

16. In a method of making a mold for molding a lens, the steps comprising:

providing electroforming master means comprising one of the following (a), (b): (a) a single electroforming master including a first mold formation at one side of the master which conforms to a certain portion of the lens, (b) a pair of electroforming masters including a second mold formation at one side of one master of said pair and a third mold formation at one side of the other master of said pair which conform to two different portions, respectively, of said lens, performing the following electroforming procedure (c) when said master means comprises said single master and the following electroforming procedure (d) when said master means comprises said pair of masters: (c) electroforming in succession on said one side of said single master a plurality of discrete electroformed first mold members each devoid of any connection to any other electroformed first mold member and each having at one side an electroformed mold formation which is a reverse gender replica of the mold formation on said single master, (d) electroforming in succession on said one side of each master of said pair of masters a plurality of discrete second mold members each devoid of any connection to any other second mold member and each having at one side an electroformed mold formation which is a reverse gender replica of the mold formation on the respective master, thereafter performing the following additional step (e) when said master means comprises said single master and the following step (f) when said master means comprises said pair of masters: (e) mutually joining the plurality of formed discrete first mold members electroformed on said single master to form a first mold assembly wherein the electroformed mold formations of the mold members in the assembly are located at one side of the assembly, (f) mutually joining the plurality of formed discrete second mold members electroformed on each master of said master pair to form a pair of second mold assemblies wherein the electroformed mold formations of the mold members in each second mold assembly are located at one side of the respective assembly, and wherein each said discrete electroformed mold member has a posterior portion opposite said one side of the respective mold member, and each said step of mutually joining discrete electroformed mold members involves contacting the posterior portions of the respective mold members with a layer of liquid bonding compound which sets to form a supporting base supporting the respective mold members.

17. A method of making an electroforming mold assembly comprising the steps of:

electroforming in succession on a common master a plurality of substantially identical electroformed members devoid of any connection to one another and each having a mold formation on one side, and thereafter mutually joining the several electroformed members to form an assembly of said electroformed members wherein the mold formations of the several electroformed members are located at the same side of the assembly.

18. A method of making an electroforming mold assembly comprising the steps of:

electroforming a plurality of discrete electroformed members devoid of any connection to one another and each having a mold formation on one side, thereafter mutually joining the several discrete electroformed members to form an assembly of said electroformed members wherein the mold formations of the several electroformed members are located at the same side of the assembly, and wherein each discrete electroformed member has a posterior portion opposite said one side of the respective electroformed member, and said step of joining said discrete electroformed members involves contacting said posterior portions of the several discrete electroformed members with a layer of liquid bonding compound which sets to form a supporting base rigidly joining the electroformed members.

19. A method of making an electroforming mold assembly comprising the steps of:

electroforming a plurality of discrete electroformed members devoid of any connection to one another and each having a mold formation on one side, thereafter mutually joining the several discrete electroformed members to form an assembly of said electroformed members wherein the mold formations of the several electroformed members are located at the same side of the assembly, and wherein each discrete electroformed member has a posterior portion opposite one side of the respective electroformed member, and said step of joining said discrete electroformed members involves removably supporting the several electroformed members within openings in a normally generally horizontal plate with each electroformed member disposed in close relation to the wall of its respective opening in the plate and with the posterior portions of the individual electroformed members projecting above the upper surface of the plate, and covering said posterior portions of the several individual electroformed members with a layer of liquid bonding compound which sets to form a supporting base rigidly joining the electroformed members.

20. The method of claim 19 wherein:

said step of forming said electroformed members involves electroforming the electroformed members on a common electroforming master.

21. The method of claim 19 wherein:

said step of forming said individual electroformed members involves electroforming the individual electroformed members on a common electroforming master by successively electroforming a magnetic metal on the electroforming master, and said method includes the additional step of magnetically holding the several individual electroformed members in said plate openings while said posterior portions of the individual electroformed members are being covered with said bonding compound and the compound sets.

22. For use in making a mold for molding a lens, the combination comprising:

a plurality of discrete separately formed mold members devoid of any bridging connection between the mold members joining the mold members to one another and each having a mold formation at one side and an opposite posterior portion, a planar base formed separately from said mold members, means mounting each mold member on said base for limited free movement relative to and parallel to the plane of said base and independently of the other mold members on the base, and wherein said combination is devoid of any adjustment for altering said limited free movement of each mold member.

23. The subject matter of claim 22, wherein:

said means mounting each mold member on said base comprises a rotatable connection between each mold member and said base which permits free rotation of each mold member relative to said base on a rotation axis normal to the plane of the base and resists movement of each mold member along its rotation axis relative to said base.

24. The subject matter of claim 22 wherein:

said means mounting each mold member on said base comprises a resiliently yieldable connection between the respective mold member and said base which is torsionally resilient about a rotation axis normal to the plane of the base and which permits rotation of the respective mold member about its rotation axis relative to said base and resists movement of the respective mold member along its rotation axis relative to said base.

25. A mold for molding at least one lens comprising;

a pair of mold sides having at least one pair of corresponding mold formations including one mold formation on one side and a corresponding mold formation on the other side, and wherein said mold sides are disposed face to face with the mold formations of each mold formation pair facing one another, said mold sides are movable to and from closed positions wherein the mold formations of each mold formation pair form a mold cavity corresponding to the lens to be molded when the mold formations of the respective pair are aligned in cavity forming relation, one mold side comprises a planar supporting base, a discrete mold member including each mold formation on the respective mold side, and means mounting each mold member on said base for limited free movement relative to and parallel to the plane of the base, and coacting indexing means on the other mold side and each mold member for aligning the mold formations of each mold formation pair in said cavity forming relation when the mold sides close, and wherein said mold is devoid of any adjustment for altering said limited free movement of each mold member.

26. A mold for molding at least one lens, comprising:

a pair of mold sides having at least one pair of corresponding electroformed cavities each including one electroformed cavity in one side and a corresponding electroformed cavity in the other side, and wherein said mold sides are disposed with the cavities of each cavity pair aligned and facing one another, and said mold sides are movable to and from closed positions wherein the cavities of each cavity pair form a mold cavity corresponding to the lens to be molded, one mold side comprises a unitary electroformed multiple cavity mold member having a plurality of cavities, the other mold side comprises a supporting base, and a plurality of individual mold members mounted on said base for individual limited movement relative to the base and each containing a mold cavity of the respective mold side, and coacting indexing means on said one mold side and each individual mold member for aligning the corresponding cavities when the mold sides close.

27. In a method of making a mold for molding a lens, the steps comprising:

provide primary electroforming master means comprising one of the following (a), (b): (a) a single primary electroforming master including a first mold formation at one side of the master which is a reverse gender replica of one portion of the lens, (b) a pair of primary electroforming masters including a second mold formation at one side of one master of said pair and a third mold formation at one side of the other master of said pair which are reverse gender replicas of two different portions, respectively, of said lens, and performing the following electroforming procedure (c) when said primary master means comprises said single primary master and the following electroforming procedure (d) when said primary master means comprises said pair of primary masters: (c) electroforming on said one side of said single primary master a secondary master having at one side a mold formation which is a reverse gender replica of the mold formation on said single primary master, and electroforming in succession on said one side of said secondary master a plurality of first mold members each having at one side an electroformed mold formation which is a reverse gender replica of the mold formation on said secondary master, (d) electroforming a secondary master on said one side of each primary master of said pair of primary masters to form a pair of secondary masters each having at one side a mold formation which is a reverse gender replica of the mold formation on the respective primary master of said primary master pair, and electroforming on each secondary master of said secondary master pair a plurality of discrete second mold members each having at one side an electroformed mold formation which is a reverse gender replica of the mold formation of the respective primary master.

28. The method of claim 17 wherein:

said method comprises the additional step of electroforming on said one side of said mold assembly a unitary multiple mold master having at one side a plurality of electroformed mold formations which are reverse gender replicas of the mold formations of said mold assembly.

29. The method of claim 17 wherein:

said method comprises the additional steps of:

forming a final electroformed mold member having at one side a plurality of final electroformed mold formations corresponding to the mold formations of said assembly, forming a plurality of second discrete mold members devoid of any connection to one another and each corresponding to a mold formation of said final mold member and having at one side a mold formation with a shape such that the mold formation on each said second discrete mold member and the corresponding mold formation of said final mold member define a mold cavity when the corresponding mold formations are aligned in a certain mold forming relation, placing each second mold member on said final mold member with the mold formation on the respective mold member and the corresponding mold formation of said final mold member aligned in said certain mold forming relation, and joining said second mold members to form a second mold assembly wherein the mold formations of said second mold members are located at one side of the second assembly.

30. In a method of making a mold for molding an intraocular lens including a central optic and haptics spaced circumferentially about and extending outwardly from the optic, the steps comprising:

providing electroforming master means comprising one of the following (a), (b): (a) a single electroforming master including a first mold formation at one side of the master which conforms to a certain portion of the lens optic and haptics, (b) a pair of electroforming masters including a second mold formation at one side of one master of said pair and a third mold formation at one side of the other master of said pair which conform to two different portions, respectively, of said lens optic and haptics, performing the following electroforming procedure (c) when said master means comprises said single master and the following electroforming procedure (d) when said master means comprises said pair of masters: (c) electroforming on said one side of said single master at least one individual first mold member having at one side an electroformed mold formation which is a reverse gender replica of the mold formation on said single master, (d) electroforming on said one side of each master of said pair of masters at least one individual mold member having at one side an electroformed mold formation which is a reverse gender replica of the mold formation of the respective master, and wherein said step of providing said electroforming master means comprises:

providing one of the following (e), (f): (e) a single primary female master including at one side a first cavity corresponding to said one portion of the lens optics and haptics, (f) a pair of primary masters including a second cavity at one side of one master of said pair of primary masters and a mold formation at one side of the other master of said pair of primary masters corresponding to said two different portions, respectively, of said lens optic and haptics, and performing one of the following electroforming procedures (g), (h): (g) electroforming on said single primary female master a secondary male master which constitutes said single electroforming master and has a male mold formation corresponding to said cavity in said single primary female master and, (h) electroforming on said one primary master of said primary master pair a secondary male master which constitutes one electroforming master of said electroforming master pair and has a male mold formation corresponding to the cavity in said one primary master of said primary master pair, and electroforming on the other primary master of said primary master pair a second master which constitutes the other electroforming master of said electroforming master pair and has a mold formation which is a reverse gender replica of the mold formation on said other primary master of said primary master pair.

31. The combination comprising:

a first mold member including a plurality of first mold formations on one side of the member;

second discrete mold members each having a second mold formation and each second mold member being removably positionable over a first mold formation with the mold formation on each second mold member facing and aligned with the respective first mold formation and forming a mold cavity with the respective first mold formation, and coacting releasably engagable indexing means on said first mold member and each second mold member for aligning the mold formation on each second mold member with the respective mold formation on said first mold member.

32. A method of making a lens mold comprising the steps of:
forming a first multiple mold member having a plurality of first mold formations on one side of the member,
removably positioning over each first mold formation a discrete second mold member having a second mold formation facing the respective first mold formation and forming a mold cavity with the respective first mold formation, and
joining the several second mold members to form a second multiple mold member.

33. The method of claim 32 wherein:
said step of joining the several second mold members comprises contacting said second mold members with a bonding compound which sets to form a supporting base for said second mold members.

34. The method of claim 32 wherein:
said step of joining the several second mold members comprises securing said second mold members to a supporting base.

35. The method of claim 32 wherein:
said step of joining the several second mold members comprises movably securing said second mold members to a supporting base.

36. In a method of making a mold for molding an intraocular lens including a central optic and haptics spaced circumferentially about and extending outwardly from the optic, the steps comprising:
providing electroforming master means comprising one of the following (a), (b): (a) a single electroforming master including a first mold formation at one side of the master which conforms to a certain portion of the lens optic and haptics, (b) a pair of electroforming masters including a second mold formation at one side of one master of said pair and a third mold formation at one side of the other master of said pair which conform to two different portions, respectively, of said lens optic and haptics,
performing the following electroforming procedure (c) when said master means comprises said single master and the following electroforming procedure (d) when said master means comprises said pair of masters: (c) electroforming on said one side of said single master at least one individual first mold member having at one side an electroformed mold formation which is a reverse gender replica of the mold formation on said single master, (d) electroforming on said one side of each master of said pair of masters at least one individual mold member having at one side an electroformed mold formation which is a reverse gender replica of the mold formation of the respective master, and wherein said step of providing said electroforming master means comprises:
providing one of the following (e), (f): (e) a single primary master including at one side a first cavity corresponding to said one portion of the lens optic and haptics, (f) a pair of primary masters including a second mold formation at one side of one master of said pair of primary masters and a third mold formation at one side of the other master of said pair of primary masters corresponding to said two different portions, respectively, of said lens optics and haptics, and
performing one of the following electroforming procedures (g), (h): (g) electroforming on said single primary master a secondary master having a mold formation which is a reverse gender replica of said cavity in said single primary master and which constitutes said single electroforming master, (h) electroforming on said primary masters of said primary master pair secondary masters having mold formations, respectively, which are reverse gender replicas of the mold formations on the respective primary masters of said primary master pair and which constitute said pair of electroforming masters.

37. The method of claim 7 wherein said step of providing said electroforming master means comprises:
providing one of the following (e), (f): (e) a single primary master including at one side a first cavity corresponding to said one portion of the lens, (f) a pair of primary masters including a second mold formation at one side of one master of said pair of primary masters and a third mold formation at one side of the other master of said pair of primary masters corresponding to said two different portions, respectively, of said lens, and
performing one of the following electroforming procedures (g), (h): (g) electroforming on said single primary master a secondary master having a mold formation which is a reverse gender replica of said cavity in said single primary master and which constitutes said single electroforming master, (h) electroforming on said primary masters of said primary master pair secondary masters having mold formations, respectively, which are reverse gender replicas of the mold formations on the respective primary masters of said primary master pair and which constitute said pair of electroforming masters.

38. The method of claim 9 wherein said step of providing said electroforming master means comprises:
providing one of the following (e), (f): (e) a single primary master including at one side a first cavity corresponding to said one portion of the lens, (f) a pair of primary masters including a second mold formation at one side of one master of said pair of primary masters and a third mold formation at one side of the other master of said pair of primary masters corresponding to said two different portions, respectively, of said lens, and
performing one of the following electroforming procedures (g), (h): (g) electroforming on said single primary master a secondary master having a mold formation which is a reverse gender replica of said cavity in said single primary master and which constitutes said single electroforming master, (h) electroforming on said primary masters of said primary master pair secondary masters having mold formations, respectively, which are reverse gender replicas of the mold formations on the respective primary masters of said primary master pair and which constitute said pair of electroforming masters.

39. For use in molding an intraocular lens having a central optic and haptics spaced circumferentially about and extending outwardly from the optic:
an electroformed mold member having an electroformed mold formation at one side including an electroformed portion corresponding to a certain portion of said intraocular lens optic and other electroformed portions corresponding to certain portions of said intraocular lens haptics.

40. A mold for molding an intraocular lens comprising:

first and second electroformed mold members having electroformed mold formations on one side which are reverse gender replicas of certain different portions, respectively, of the intraocular lens, and wherein said electroformed mold members are positionable in face to face mold forming relation wherein said mold formations form an electroformed lens mold cavity which is a reverse gender replica of said intraocular lens.

41. A method of making a mold member for molding an intraocular lens having a central optic and haptics spaced circumferentially about and outwardly from the optic, said method comprising the steps of:

providing a primary electroforming master having a mold formation which is a reverse gender replica of a certain portion of the intraocular lens optic and haptics, electroforming on said primary master a secondary master having a mold formation which is a reverse gender replica of the mold formation on the primary master, and electroforming on said secondary master a mold member having a mold formation which is a same gender replica of the mold formation on said primary master.

42. A method comprising the steps of:

providing a pair of electroformed mold members having electroformed mold formations, respectively, which are reverse gender replicas of two different portions of an intraocular lens having a central optic and haptics spaced circumferentially about and extending outwardly from the optic, said mold formations include a mold formation recess in at least one member including recess portions corresponding to certain portions of the lens optic and haptics such that said mold members are positionable in face to face mold forming relation wherein said mold formations form a mold cavity which is a reverse gender replica of said lens, and relatively moving said mold members between an open position wherein said mold members are spaced to receive a lens molding compound in said recess and a closed position wherein said mold members are disposed in said mold forming relation to mold said compound into an intraocular lens.

43. A mold for molding an intraocular lens having a central optic and haptics spaced circumferentially about the optic, said mold comprising:

a pair of electroformed mold members having electroformed mold formations, respectively, and wherein the mold formation on each mold member includes an electroformed mold formation portion corresponding to a certain portion of said lens optic and other electroformed mold formation portions corresponding to certain portions of said lens haptics, such that said mold members are positionable in face to face mold forming relation wherein the mold formations on said mold members form an electroformed mold cavity corresponding to said lens.

44. A method of molding an intraocular lens having a central optic and haptics spaced circumferentially about and extending outwardly from the optic, said method comprising the steps of:

providing a pair of electroformed mold members having electroformed mold formations, respectively, each mold formation including an electroformed mold formation portion corresponding to a certain portion of said lens optic and other electroformed mold formation portions corresponding to certain portions of said lens haptics, such that said mold members are positionable in a face to face mold forming relation wherein the mold formations of said mold members form an electroformed mold cavity corresponding to said lens, relatively moving said mold members between said mold forming relation and an open relation wherein the mold members are spaced to receive a molding compound which is molded in said cavity upon subsequent relative movement of the mold members to said mold forming relation.

* * * * *